US006736476B2

United States Patent
Inoue et al.

(10) Patent No.: US 6,736,476 B2
(45) Date of Patent: May 18, 2004

(54) IMAGE FORMING SYSTEM AND IMAGE FORMING APPARATUS

(75) Inventors: Hirowo Inoue, Kawasaki (JP); Hisashi Ishikawa, Yokohama (JP); Hiroshi Tajika, Yokohama (JP); Miyuki Fujita, Tokyo (JP); Yuji Konno, Kawasaki (JP); Kenji Takahashi, Kawasaki (JP); Norihiro Kawatoko, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/910,841

(22) Filed: Jul. 24, 2001

(65) Prior Publication Data

US 2001/0045966 A1 Nov. 29, 2001

Related U.S. Application Data

(62) Division of application No. 09/021,459, filed on Feb. 10, 1998, now Pat. No. 6,273,535.

(30) Foreign Application Priority Data

Feb. 14, 1997 (JP) .............................. 9-030890

(51) Int. Cl.[7] .............................................. H04N 1/034
(52) U.S. Cl. ............................................................ 347/3
(58) Field of Search .......................... 347/2, 3, 14, 37; 396/429; 348/207, 232; 358/1.9

(56) References Cited

U.S. PATENT DOCUMENTS

| 4,574,319 A | * | 3/1986 | Konishi ........................ 348/232 |
| 4,728,978 A | * | 3/1988 | Inoue et al. ................. 396/409 |
| 4,739,397 A | | 4/1988 | Hayashi ........................ 358/80 |
| 4,875,174 A | | 10/1989 | Olodorf et al. .............. 364/519 |
| 5,198,833 A | * | 3/1993 | Kubota ........................ 347/15 |
| 5,258,773 A | | 11/1993 | Arakawa et al. | |
| 5,345,315 A | | 9/1994 | Shalit .......................... 358/406 |
| 5,488,223 A | | 1/1996 | Autin et al. ................. 235/375 |
| 5,493,409 A | * | 2/1996 | Maeda et al. ................ 358/296 |
| 5,619,646 A | * | 4/1997 | Hoch et al. ............. 395/200.01 |
| 5,633,678 A | | 5/1997 | Parulski et al. ............. 348/232 |
| 5,668,581 A | * | 9/1997 | Tsuji et al. ..................... 347/37 |
| 5,696,850 A | | 12/1997 | Parulski et al. ............. 382/261 |
| 5,757,388 A | * | 5/1998 | Stephenson .................... 347/2 |
| 5,787,259 A | * | 7/1998 | Haroun et al. ............... 709/253 |
| 6,115,137 A | * | 9/2000 | Ozawa et al. ................ 358/1.6 |
| 6,273,535 B1 | * | 8/2001 | Inoue et al. .................... 347/3 |

FOREIGN PATENT DOCUMENTS

| JP | 57-185778 | 11/1982 |
| JP | 7-040550 | 2/1995 |
| JP | 7-212706 | 8/1995 |
| JP | 10-191246 | 7/1998 |

OTHER PUBLICATIONS

Japanese Official Action dated Jun. 27, 2003.

* cited by examiner

Primary Examiner—Juanita Staphens
Assistant Examiner—Blaise Mouttet
(74) Attorney, Agent, or Firm—Fitzpatrick, Cella, Harper & Scinto

(57) ABSTRACT

When an image is sensed by a digital camera, image additional information as the image sensing conditions is stored together with the sensed image information. Also, information unique to that digital camera is stored together with the image additional information. The digital camera is connected to a printer by, e.g., an IEEE1394 I/F. The printer stores printing control information as various combinations of unique information such as its printing method, the types of ink, paper, and the like, print quality and print speed, and processing technique such as masking. In response to a print instruction, the printer reads the image information and image additional information from the digital camera, and selects the printing control information in accordance with the read information and the set printing mode. The printer prints an image using the selected printing control information.

31 Claims, 27 Drawing Sheets

FIG.2

| Label | ID |
|---|---|
| RESOLUTION INFORMATION | 13-1 |
| COLOR MODE INFORMATION | 13-2 |
| COLOR PROCESSING INFORMATION | 13-3 |
| FLASH ON/OFF | 13-4 |
| STOP INFORMATION | 13-5 |
| SHUTTER SPEED | 13-6 |
| OBJECT DISTANCE | 13-7 |
| ZOOM RATIO | 13-8 |
| LENS TYPE | 13-9 |
| FILTER TYPE | 13-10 |
| VIBRATION SENSOR VALUE INFORMATION | 13-11 |
| DATE INFORMATION | 13-12 |
| PLACE CODE | 13-13 |
| IMAGE DATA SIZE | 13-14 |
| COLOR PROCESSING PARAMETER INFORMATION IN CAMERA | 13-15 |
| CAMERA TYPE INFORMATION | 13-16 |
| CAMERA RECOMMENDED PRINTING PARAMETER | 13-17 |
| etc. | |

IMAGE ADDITIONAL INFORMATION

FIG.3

| | |
|---|---|
| HEAD TYPE | 14-1 |
| INK TYPE | 14-2 |
| PAPER SIZE | 14-3 |
| PAPER TYPE | 14-4 |
| PRINT QUALITY SETTING VALUE | 14-5 |
| CLEANING RECORD | 14-6 |
| CURRENT TIME | 14-7 |
| INK REMAINING AMOUNT | 14-8 |
| HEAD USE TIME | 14-9 |
| PRINTER TYPE | 14-10 |
| PRINTER RESOLUTION | 14-11 |
| PRINT SPEED | 14-12 |
| etc. | |

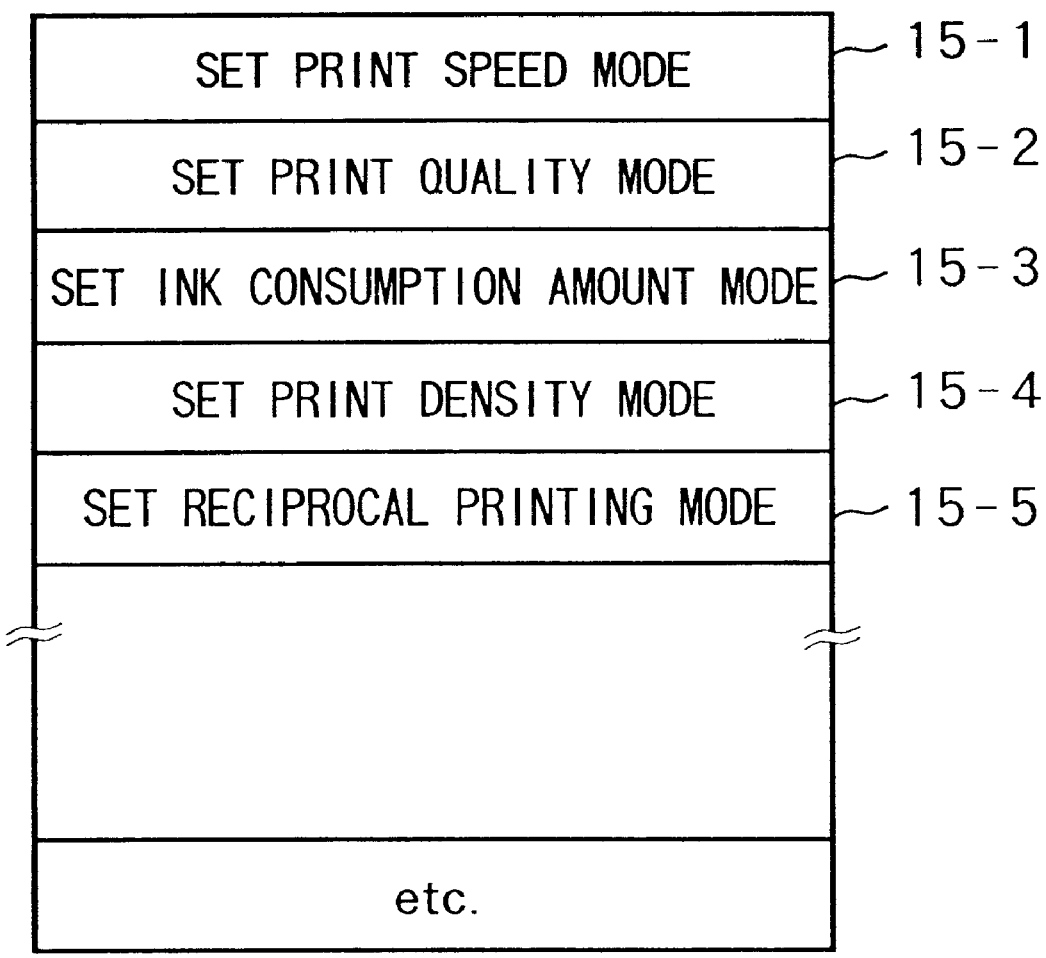

FIG.5

| | QUALITY EVALUATION INFORMATION | SPEED EVALUATION INFORMATION | INK CONSUMPTION AMOUNT |
|---|---|---|---|
| 16-1 MASKING TECHNIQUE TYPE | QUALITY EVALUATION INFORMATION | SPEED EVALUATION INFORMATION | INK CONSUMPTION AMOUNT |
| 16-1-1 MASKING PARAMETER | | | |
| 16-2 RECIPROCAL PRINTING INFORMATION | QUALITY EVALUATION INFORMATION | SPEED EVALUATION INFORMATION | INK CONSUMPTION AMOUNT |
| 16-3 PRINT RESOLUTION TYPE INFORMATION | QUALITY EVALUATION INFORMATION | SPEED EVALUATION INFORMATION | INK CONSUMPTION AMOUNT |
| 16-4 PRINT SPEED TYPE INFORMATION | QUALITY EVALUATION INFORMATION | SPEED EVALUATION INFORMATION | INK CONSUMPTION AMOUNT |
| etc. | | | |

16-5, 16-6, 16-7

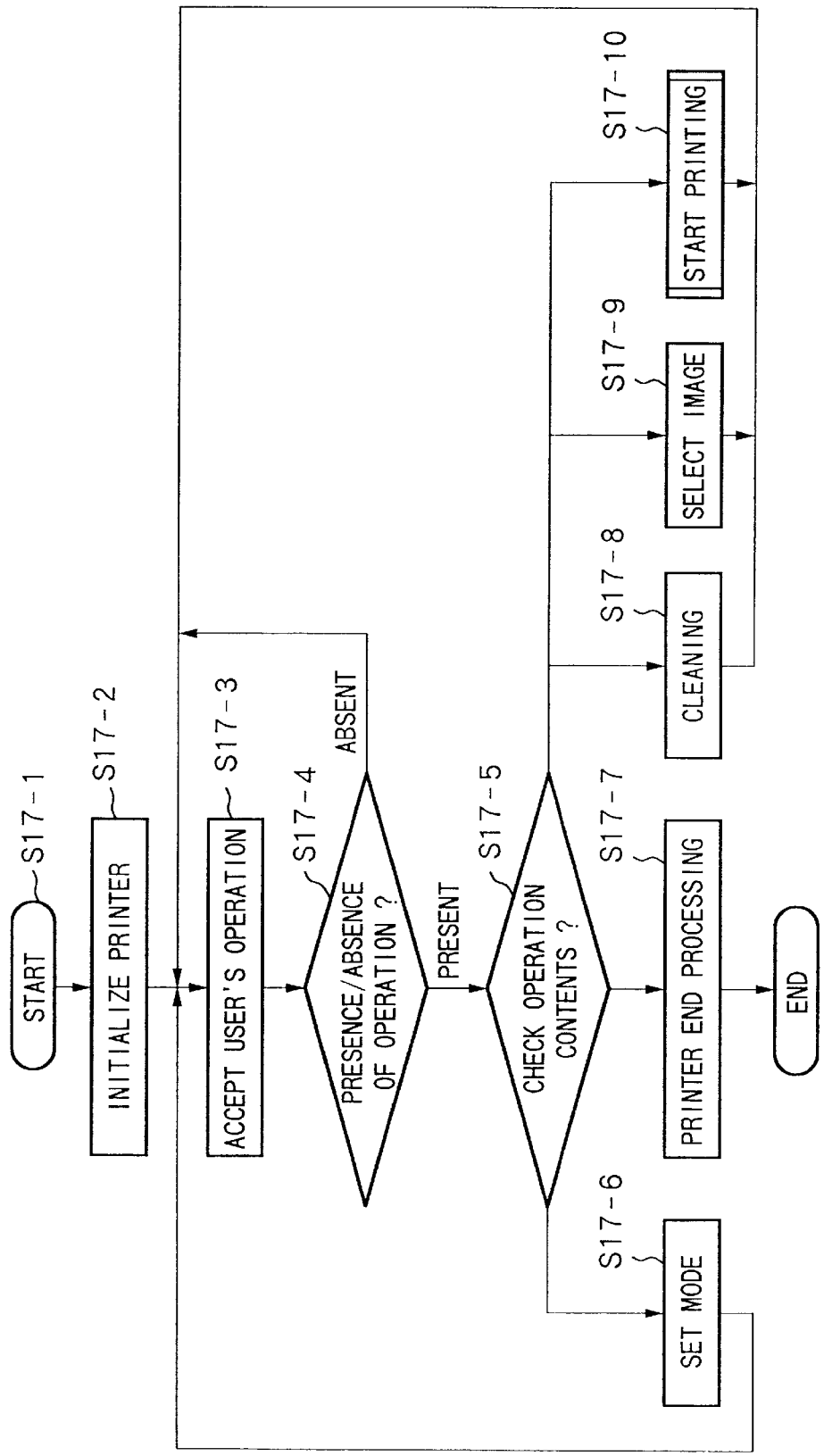

POWER SUPPLY LINE
( 8-40V, DC MAXIMUM CURRENT 1.5 A )

TWO PAIRS OF TWISTED PAIR
SIGNAL LINES

CABLE SECTIONAL VIEW

SIGNAL LINE SHIELD

EX-OR SIGNAL BETWEEN Data AND Strobe

BRANCH: NODE HAVING TWO OR MORE NODE CONNECTIONS
LEAF: NODE HAVING ONLY ONE NODE CONNECTION
□: PORT
c: PORT CORRESPONDING TO CHILD NODE
p: PORT CORRESPONDING TO PARENT NODE

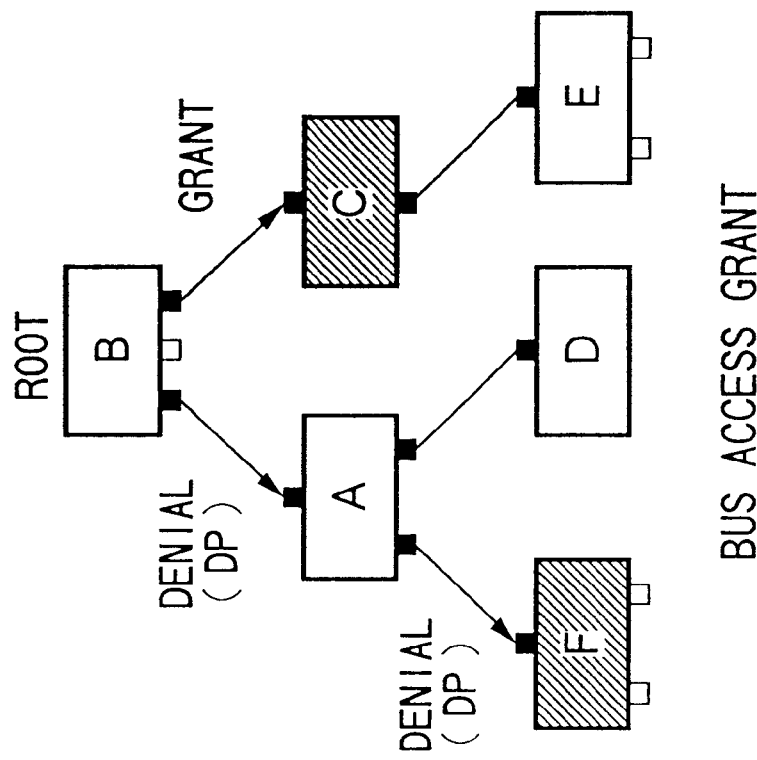
FIG.20A  BUS ACCESS REQUEST
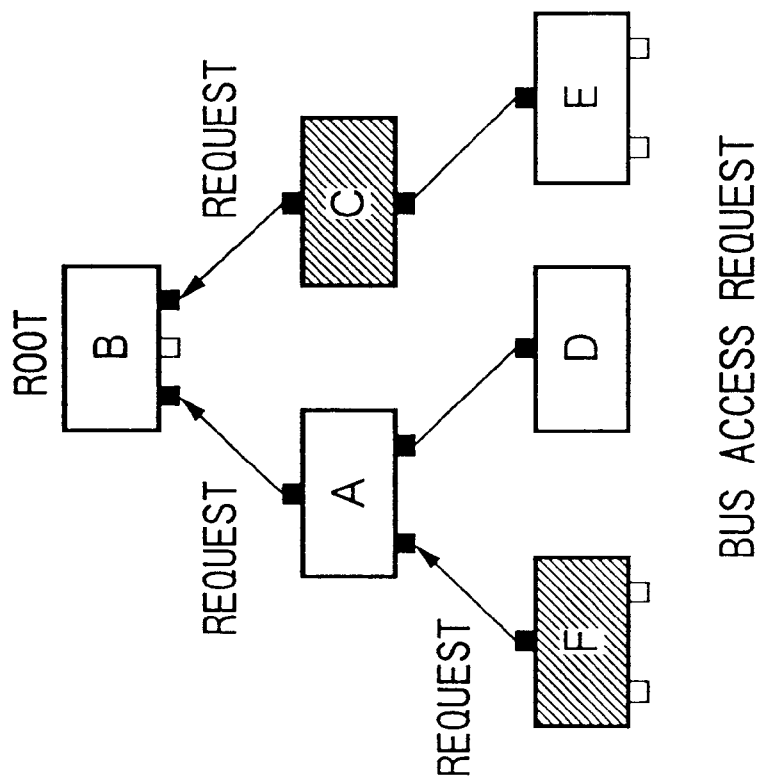
FIG.20B  BUS ACCESS GRANT

IMAGE FORMING SYSTEM AND IMAGE FORMING APPARATUS

This is a divisional application of application Ser. No. 09/021,459 filed Feb. 10, 1998.

BACKGROUND OF THE INVENTION

1. Field of the Invention

The present invention relates to an image forming system and, more particularly, to an image forming system and image forming apparatus for forming a hard copy of an image or the like captured by, e.g., a digital camera.

2. Related Art

Conventionally, a system in which an input image from a digital input device such as a scanner, digital camera, or the like is printed via a host such as a personal computer (PC) is known. In such system, the host has drivers for independently controlling the digital input device and printer. For this reason, an input from the digital input device is saved as data in the format which is easiest to use and display on the host. Upon printing, the user observes the state of the saved image and selects a proper printing control method or image processing method.

For this reason, if the host can cope with color image data, even a monochrome sensed image is saved as a color image and is unwantedly printed using color inks. Also, even a low-resolution image such as a thumbnail image is printed in a high-quality mode depending on its saving condition. In this manner, since image data is saved in the format suitable for the host, an image formed based on the saved image data becomes different from the input one, and consequently, extra processing that is not required originally must often be performed. Furthermore, when an input image is saved in the host, extra processing for converting it into a format suitable for the host is required.

SUMMARY OF THE INVENTION

The present invention has been made in consideration of the above-mentioned prior art, and has as its object to provide an image forming system and image forming apparatus, which can output an image under the condition suitable for the input condition of that image, thus quickly outputting an image with higher quality.

It is another object of the present invention to provide an image forming system and image forming apparatus, which build a system that can efficiently execute such image forming control.

It is still another object of the present invention to provide an image forming system and image forming apparatus, which have novel functions.

In order to achieve the above objects, an image forming system of the present invention comprises the following arrangement.

That is, an image forming system comprises:
an electronic device having
recording means for recording an image sensing condition of a target image together with the image, and
reproduction means for reproducing the image recorded by the recording means; and
an image forming apparatus having
image forming means for forming an image under a given image forming condition, and
setting means for setting the image forming condition in accordance with the image sensing condition.

Alternatively, an image forming system comprises:
an electronic device having
recording means for recording an image sensing condition of a target image together with the image, and
reproduction means for reproducing the image recorded by the recording means;
an image forming apparatus having
image forming means for forming an image under a given forming condition, and
setting means for setting the forming condition; and
mediation means for mediating the image sensing condition and the forming condition set by the setting means.

Or, an image forming apparatus used together with an electronic device having reproduction means for reproducing an image recorded by recording means for recording an image sensing condition of a target image together with the image, comprises:
image forming means for forming an image under a given image forming condition; and
setting means for setting the image forming condition in accordance with the image sensing condition.

In addition, an image forming apparatus used together with an electronic device having reproduction means for reproducing an image recorded by recording means for recording an image sensing condition of a target image together with the image, comprises:
image forming means for forming an image under a given forming condition;
setting means for setting the forming condition; and
mediation means for mediating the image sensing condition and the forming condition set by the setting means.

Also, an image forming method for forming an image in accordance with an image signal from an electronic device having reproduction means for reproducing an image recorded by recording means for recording an image sensing condition of a target image together with the image, comprises the step of:
setting an image forming condition of image forming means in accordance with the image sensing condition.

Lastly, there is provided a storage medium for storing a computer program for forming an image in accordance with an image signal from an electronic device having reproduction means for reproducing an image recorded by recording means for recording an image sensing condition of a target image together with the image, the program including the processing step of setting an image forming condition of image forming means in accordance with the image sensing condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows an example of the data format that stores unique information of a digital input device and digital image;

FIG. 3 shows an example of the data format that stores unique information of a printer;

FIG. 4 shows an example of the data format that stores information of a mode designated by the user and the like;

FIG. 5 shows an example of the data format that stores selectable printing control processing operations of the printer and their parameters;

FIG. 6 is a flow chart showing an example of the control processing of the overall printer;

FIGS. 20A and 20B are diagrams for explaining bus arbitration;

DETAILED DESCRIPTION OF THE PREFERRED EMBODIMENTS

Figure 1:
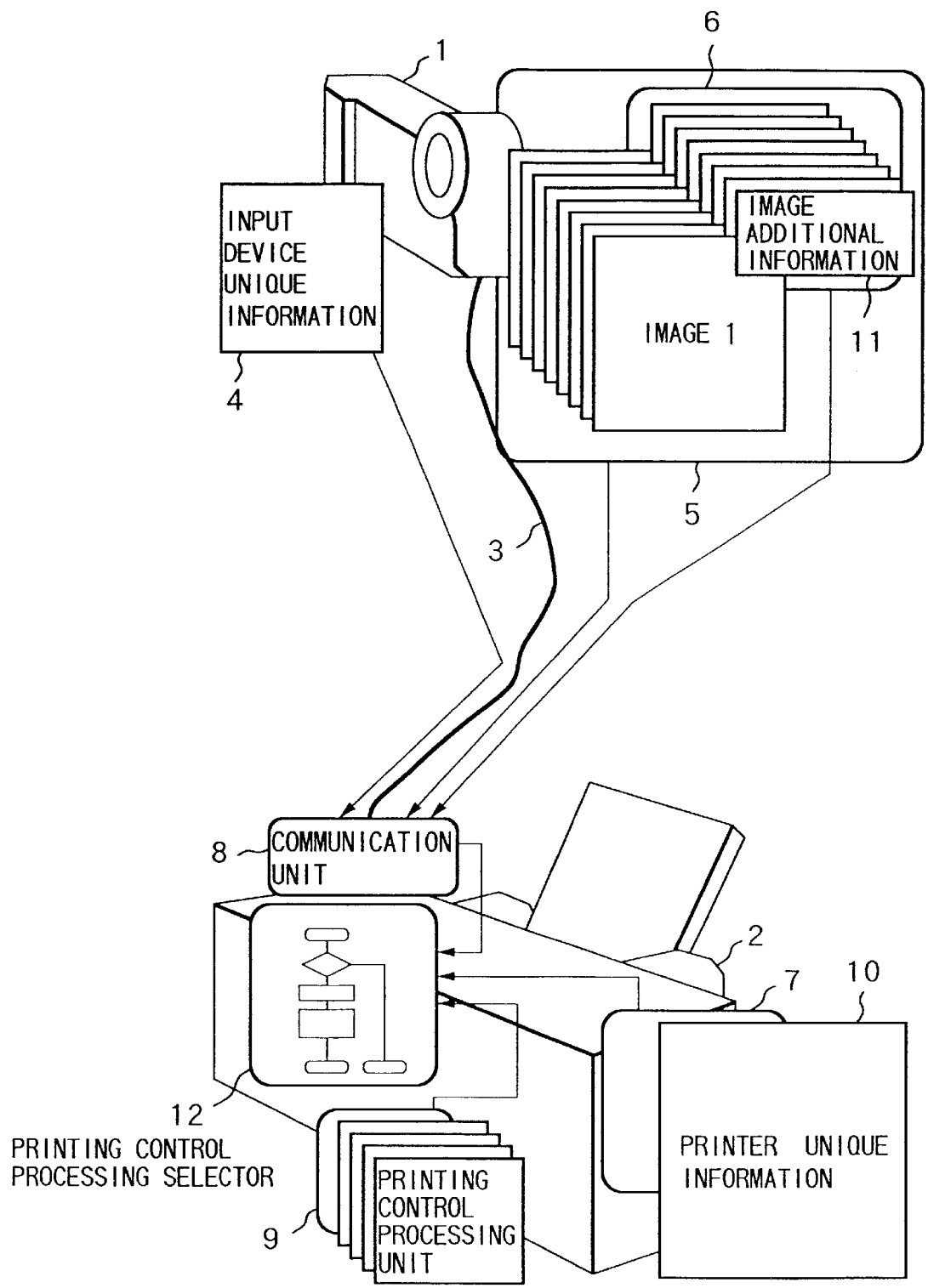
FIG. 1 is a schematic view showing the arrangement of a digital image printing system according to an embodiment of the present invention.

FIG. 1 shows the arrangement of a printing system in which a digital image input device and printer are directly connected without intervention of a host. In FIG. 1, the printing system includes a digital camera 1 as a digital image input device for inputting a digital image, a printer 2 having a communication function with the digital camera 1, and a communication medium 3 such as a cable for connecting the digital camera 1 and printer 2, an infrared ray communication unit, and the like.

The digital camera 1 stores input device unique information unique to the device in a status memory 4. Also, the digital camera 1 photoelectrically converts an image into an electrical signal using a CCD and the like, and holds a plurality of images as digital image data in an image memory 5. At the same time, the digital camera 1 stores the input states of the individual images held in the image memory 5 and parameters of color processing and the like executed in the digital camera in an image additional information memory 6 as image additional information 11. Such information is stored in a RAM or a nonvolatile RAM, or a magnetic storage medium or magnetooptical recording medium.

The printer 2 holds printer unique information 10 including the current state such as the type of currently set ink, head type, paper type, and the like, and information associated with the printer itself such as a printer printing speed, printing mechanism, and the like in a printer status memory 7. Also, the printer 2 holds a plurality of kinds of printing control information as combinations of the types of printing control processing such as print quality, image processing, print speed, masking, and the like, that can be executed by the printer, and their parameters in a printing control information memory 9. Furthermore, printing mode information such as a density designated by the operator at a control panel (not shown) is also stored in the printer status memory 7. As these memories, a RAM, a nonvolatile RAM, or a magnetic storage medium may be used.

Furthermore, the printer 2 requests the digital camera 1 to transfer image information stored in the image memory 5 and image additional information 11 corresponding to that image via a communication unit 8 with the digital camera, and reads out such information. The communication unit 8 can be implemented by an interface such as a USB (Universal Serial Bus), IEEE1394, or the like. A processing selector 12 selects an appropriate one of the plurality of kinds of printing control information held in the printing control information memory 9 on the basis of the obtained image additional information 11 and the printer unique information 10 held in the printer status memory 7, and printing control suitable for the readout image information is done in a predetermined sequence using the selected printing control information as parameters. Selection of the printing control information and printing control based on the selected information are done by executing programs stored in a ROM or the like. With such control, the printer 2 can execute processing by selecting printing control optimal to the digital camera and input digital image, and can obtain an optimal printing result.

In this embodiment, the above arrangement realizes means for obtaining information for printing control that cannot be obtained by the conventional system from the digital camera 1, and comparing the obtained information with the printer unique state and condition. By obtaining the image additional information in this way, the best or most suitable printing control processing can be selected in correspondence with the current printer state, and the print quality and print speed can be improved as a whole.

FIG. 2 shows an example of the data format of the image additional information upon inputting an image of the digital camera as an example of the digital input device of this embodiment, and unique information of the digital camera main body. The image additional information and unique information are separately stored in FIG. 1, but are shown together in FIG. 2. When information is transferred from the digital camera 1 to the printer 2, data with such format is transferred. In FIG. 2, items 13-1 to 13-15 correspond to image additional information generated in units of images, and an item 13-16 and subsequent items correspond to digital input device unique information.

The image additional information 11 includes resolution information 13-1, color mode information 13-2, and color processing information 13-3, which are particularly related to printing and obtained upon image sensing, and flash ON/OFF data 13-4, stop information 13-5, shutter speed 13-6, object distance 13-7, zoom magnification 13-8, lens type 13-9, filter type 13-10, vibration sensor value 13-11, date 13-12, place code 13—13, image data size 13-14, and color processing parameter 13-15 in the camera, as image sensing conditions. The digital input device unique information includes camera type information 13-16, camera unique printing parameter 13-17, and the like.

FIG. 3 shows an example of the data format of the image forming conditions, i.e., the printer unique information 10 that includes information unique to the printer and its current state. This information is utilized for printing control. The printer unique information 10 includes, e.g., a head type 14-1, ink type 14-2, paper size 14-3, paper type 14-4, print quality setting value 14-5, cleaning record 14-6, current time 14-7, ink remaining amount 14-8, head used time 14-9, printer type 14-10, printer resolution 14-11, print speed 14-12, and the like in addition to a recording method (an ink-jet method in this embodiment).

FIG. 4 shows an example of the data format for storing print mode values set by the user. Print speed high/low data 15-1, print quality high/low data 15-2, ink remaining amount large/small data 15-3, ink density dark/light (i.e., high/low density) data 15-4, reciprocal print ON/OFF data 15-5, and the like are recorded in this format. The ink remaining amount large/small data can realize a mode that can reduce the ink consumption amount as compared to normal printing by image processing for, e.g., forming only the edge portion of an image to be printed so as to leave a uniform color region as a blank image.

FIG. 5 shows an example of the data format of printing control information that individually includes selectable printing control processing operations such as masking and the like and their parameters, and the features in these processing operations. For example, a masking technique type 16-1, parameters for the individual techniques, and mask data 16-1-1, reciprocal print enable/disable information 16-2, print resolution type 16-3, print speed type 16-4, and the like are recorded in this format. Also, print quality evaluation information 16-5, print speed evaluation information 16-6, and ink consumption amount 16-7 for the individual processing are recorded in this format. Upon printing, those parameters of, e.g., the masking technique, presence/absence of reciprocal printing, resolution, and print speed, which are suited to given conditions such as the print speed, print quality, ink consumption amount, or the like are retrieved, and optimal parameters are selected from the retrieved parameters. Printing is done using the selected parameters.

FIG. 6 is a flow chart showing the overall flow of printing control processing in the printing system shown in FIG. 1.

When the printer is started in step 17-1, it is initialized in step 17-2. The user's operation is accepted in step 17-3, and the presence/absence of user's operation is checked in step 17-4. If no user's operation is detected, the flow returns to step 17-3. If a user's operation is detected, the flow branches to the processing according to the operation in step 17-5. If the operation indicates the setups of a print mode, the mode set in step 17-6 is registered in the data format shown in FIG. 4.

If the operation is turning off the printer power switch, end processing is executed in step 17-7, and after that, the processing ends.

If the operation is cleaning operation, an ink-jet head is cleaned in step 17-8.

If the operation is image selection, an image to be printed is selected in step 17-9.

If the operation is print start, the selected image is printed in step 17-10.

Note that the operation accepted in step 17-3 may be operation from either the printer 2 or digital camera 1. In latter case, the operation contents of the camera 1 are transmitted via the communication medium 3.

Figure 7:
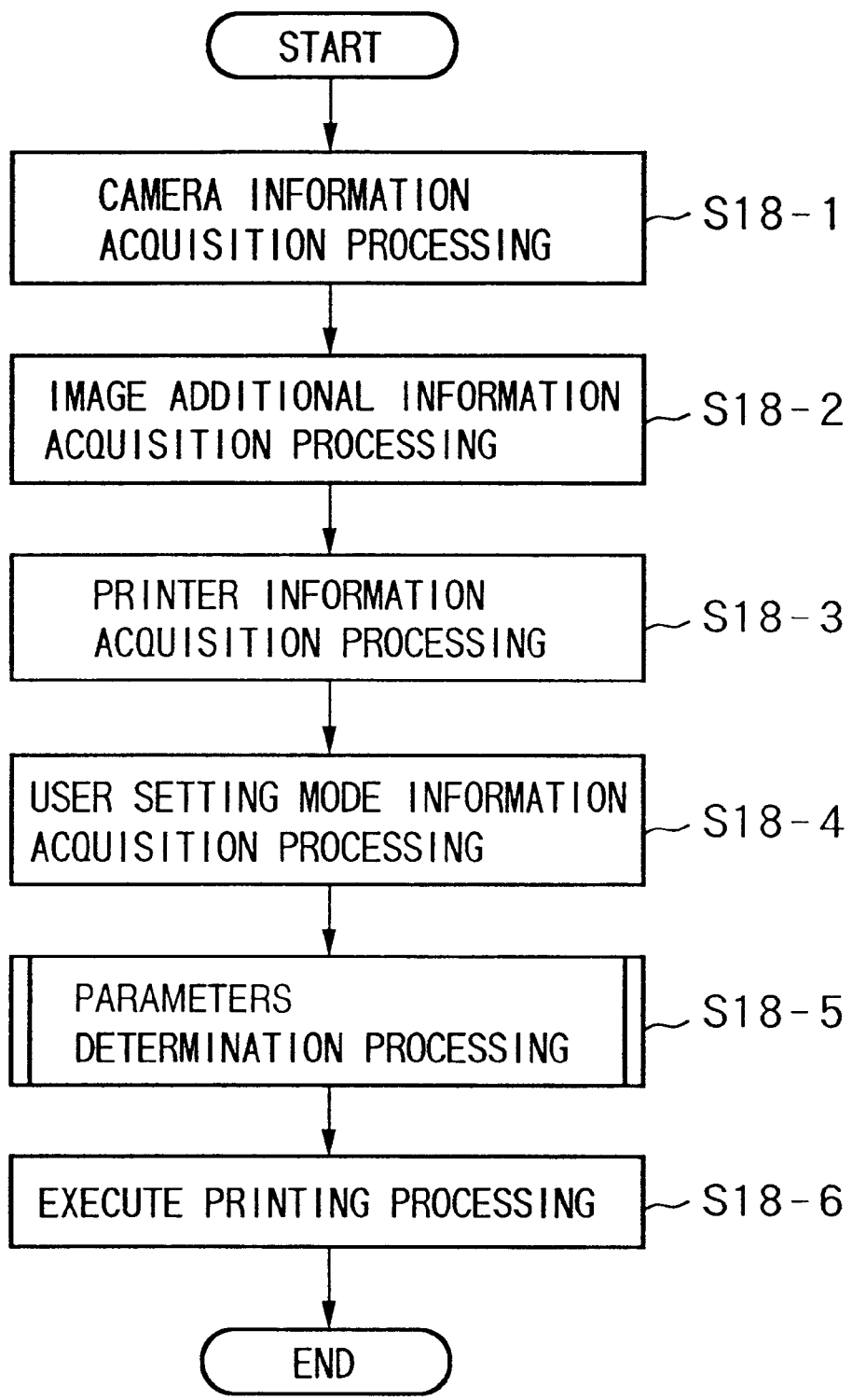
FIG. 7 is a flow chart showing an example of the processing for selecting the printing control processing.

FIG. 7 is a flow chart showing the processing for selecting printing control processing using the information in the formats shown in FIGS. 2 to 5 before printing is started in step 17-10 in FIG. 6.

In this processing, communications for acquiring camera unique information (the digital input device unique information) stored in the status memory 4 are done to acquire the camera unique information in step 18-1. The information to be acquired includes the camera type information 13-16, recommended print parameter 13-17, and the like shown in FIG. 2.

In step 18-2, communications for acquiring image additional information of the image information to be printed are done to acquire the additional information of the image to be printed. The information to be acquired includes the resolution information 13-1 to color processing parameter 13-15 in the camera shown in FIG. 2.

In step 18-3, the printer state and the printer unique information are read out from the printer status memory 7.

In step 18-4, the mode information set by the user is read out.

In step 18-5, parameters for the printing control processing are determined based on the information acquired in steps 18-1 to 18-4.

In step 18-6, printing is executed in accordance with the parameters determined in step 18-5 above, thus printing the selected image.

Figure 8:
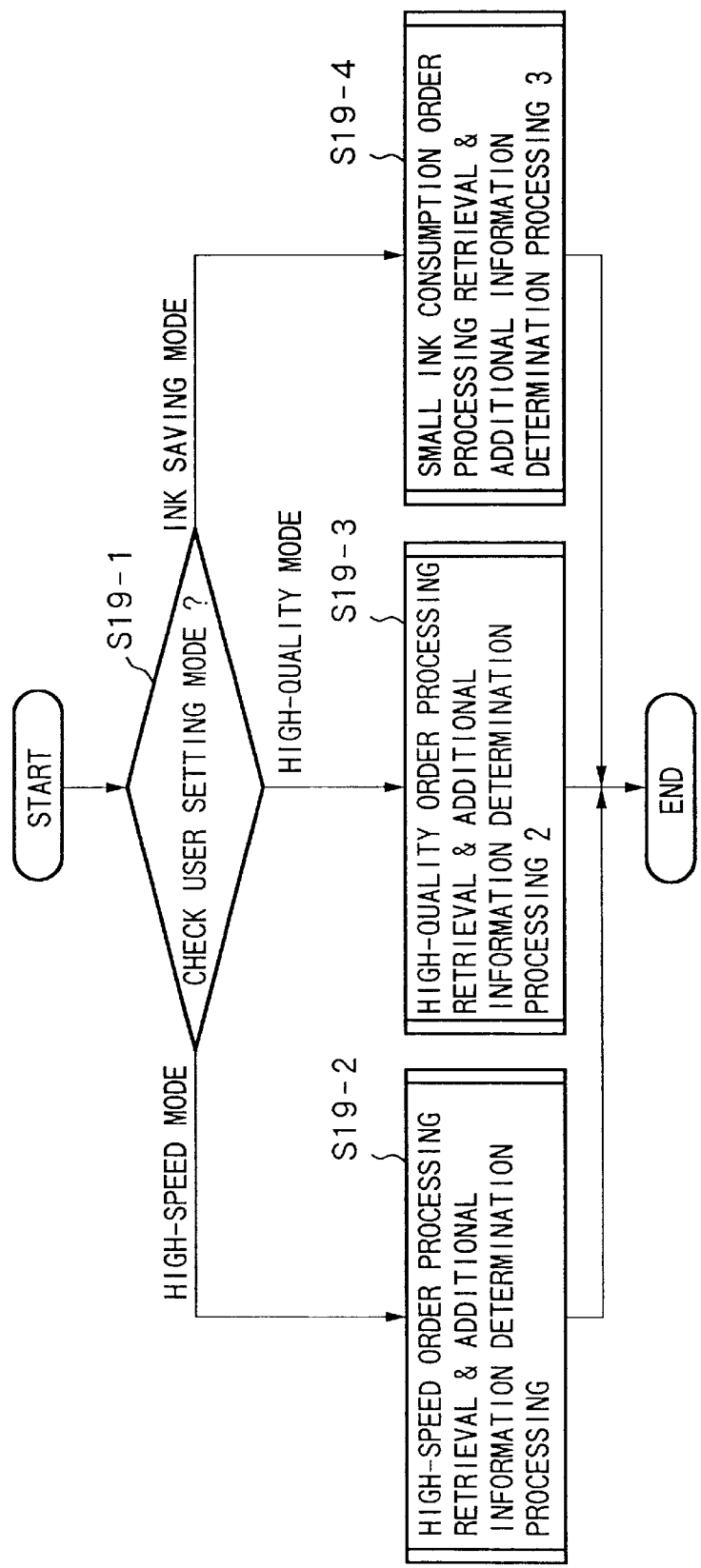
FIG. 8 is a flow chart showing an example of the processing for determining the printing control processing.

FIG. 8 is a detailed flow chart of the parameters determination processing in step 18-5 in FIG. 7.

In step 19-1, the print mode set by the user is checked.

If a high-speed print mode is set, the flow advances to step 19-2. In step 19-2, processing techniques are sorted in the order of higher speeds using the speed evaluation information 16-6 of the printing control information shown in FIG. 5 as a key, and the processing technique is determined also considering other kinds of information.

If a high-quality print mode is set, the flow advances to step 19-3. In step 19-3, processing techniques are sorted in the order of higher qualities using the quality evaluation information 16-5 of the printing control information shown in FIG. 5 as a key, and the processing technique is determined also considering other kinds of information.

If an ink saving mode is set, the flow advances to step 19-4. In step 19-4, processing techniques are sorted in the order of smaller ink consumption amounts using the ink consumption amount evaluation information 16-7 of the printing control information shown in FIG. 5 as a key, and the processing technique is determined considering other kinds of information as well.

Figure 9:
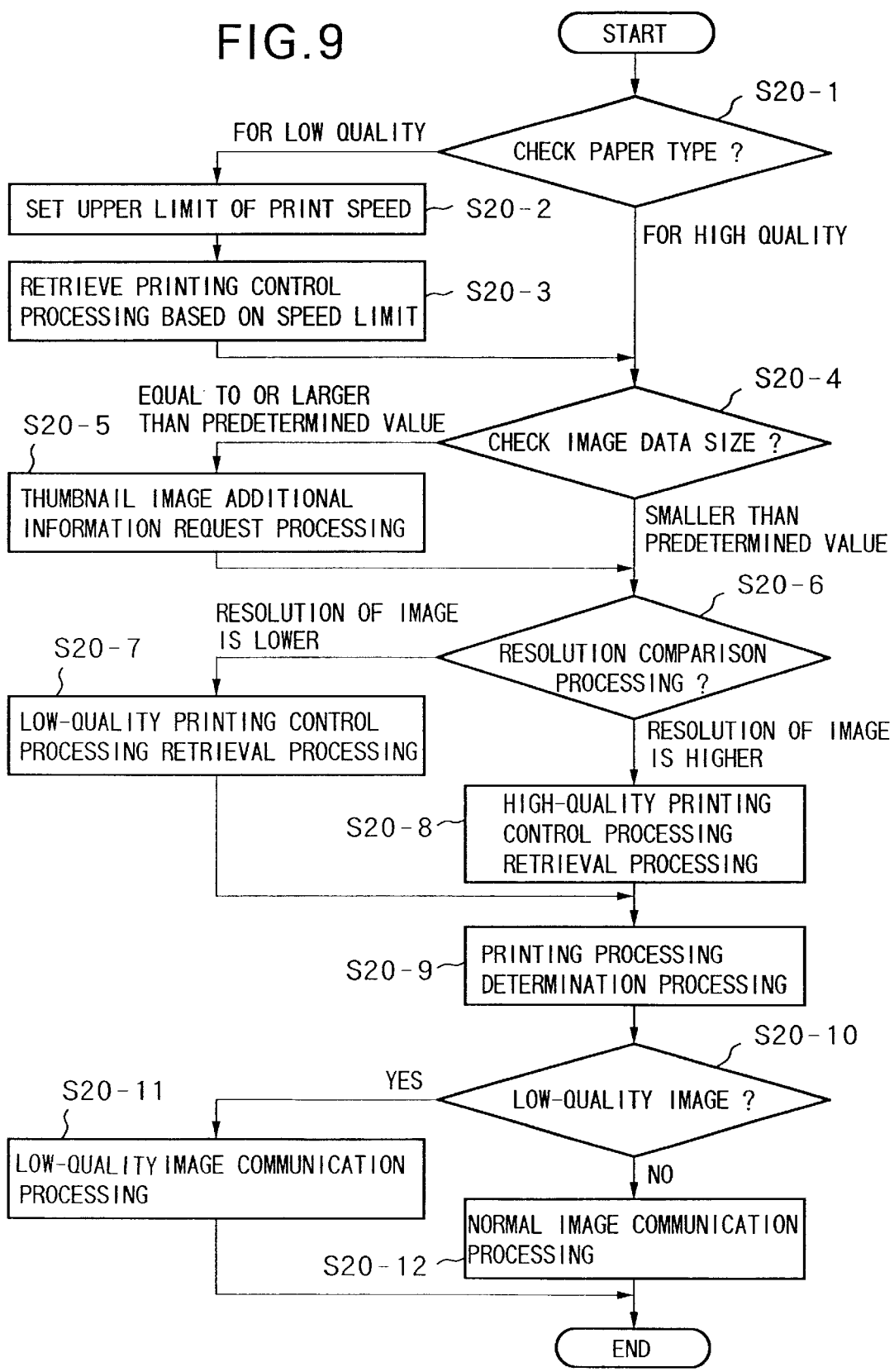
FIG. 9 is a flow chart showing an example of the processing for selecting the printing control processing associated with detailed information of a digital image input device and the printer.

FIG. 9 is a flow chart showing the determination processing associated with the additional information in step 19-2 in FIG. 8. At the beginning of the processing shown in FIG. 9, the processing techniques have been sorted in the order of higher speeds. In step 20-1, the paper type set in the printer is checked on the basis of the information acquired in step 18-3 in FIG. 7. If low-quality paper such as normal paper is set, the upper limit of the print speed is set in step 20-2, and the processing techniques, the processing speed of which is equal to or lower than the set upper limit speed, are retrieved from the speed evaluation information 16-6 shown in FIG. 5 in step 20-3. If high-quality paper is set, the flow directly advances to step 20-4.

In step 20-4, the data size of the image to be printed is checked. If the data size is very large, the flow advances to step 20-5 to perform communications requesting the digital camera to send image additional information of a low-quality image such as a thumbnail image. If the data size is small, since transmission and mapping can be done at high speed, the flow directly advances to step 20-6. The data size can be checked in step 20-4 by comparing it with a predetermined size.

In step 20-6, the resolution information of the image additional information is compared with the resolution of the printer. If the image resolution is extremely lower than that of the printer, the flow advances to step 20-7 to retrieve the processing techniques with the quality evaluation information 16-7 (FIG. 5)="low quality".

If the resolution of the printer is equivalent to that of the image, the flow advances to step 20-8 to retrieve the processing techniques with the quality evaluation information 16-7 (FIG. 5)="high quality". In this checking, for example, the resolution included in the image additional information is compared with that of the printer, and if the resolution of the image additional information is lower than that of the printer by a predetermined value or more, "low quality" may be determined.

In step 20-9, a processing technique with the highest order among those retrieved until step 20-8, i.e., the highest-speed processing method, is determined as that used in printing. In the example shown in FIG. 5, of the techniques and Parameters that meet the given conditions, the highest-speed masking technique and masking parameters, the print resolution that can assure the highest speed, and the like are determined. Also, whether to perform reciprocal printing is determined to attain higher-speed printing.

In step 20-10, the image quality determined in step 20-6 is checked. If low quality is determined, the flow advances to step 20-11 to request a low-quality image; otherwise, the flow advances to step 20-12 to request normal image information, thus ending the printing processing technique determination processing.

After the above processing, an image is printed out in accordance with the printing technique determined in the above-mentioned sequence. The processing sequence shown in FIG. 9 is similarly executed not only in the high-speed mode but also in the high-quality mode and ink saving mode. In this case, in step 20-9, a printing technique that can assure the highest quality is selected in case of the high-quality mode, and a printing technique that can assure the smallest ink consumption amount is selected in case of the ink saving mode.

For this reason, if the high-quality mode is set, the processing technique is selected in consideration of the image data size and resolution, and an image can be printed out under the conditions suitable for the generation conditions of the image to be printed.

Also, for example, the digital image input device 1 may have information associated with the upper limit communication speed, and that information may be acquired from the digital camera in step 18-1 in FIG. 7. In the determination processing associated with other information shown in FIG. 9, the time required for communications is calculated on the basis of the upper limit communication speed and the image data volume, and if the time required for communications is longer than that required for printing, higher-quality printing control processing may be selected to print an image at a speed corresponding to the communication speed.

Furthermore, in the determination processing associated with other information shown in FIG. 9, the color mode information 13-2 shown in FIG. 2 may be referred to, and if the image to be printed is an image sensed in a monochrome character mode, contrast is more important than gradation information and the like. Hence, in such case, printing control processing that uses K (black) without mixing Y (yellow), M (magenta), and C (cyan) to form an image may be executed.

Moreover, if the image was sensed in a macro mode for taking a close-up picture, high-quality printing control processing may be automatically selected independently of the mode set by the user in step 19-1 in FIG. 8. The macro mode information can be determined based on the lens type 13-9, object distance 13-7, and the like shown in FIG. 2.

In addition, if a digital image input device using a CCD having four hundred thousand pixels or less is used, a printing control mode that gives priority to high-speed printing may be automatically selected independently of the mode set by the user in step 19-1 in FIG. 8. The number of pixels of the CCD can be obtained from the camera type information 13-16 shown in FIG. 2.

Control Structure of Printing System

Figure 13:
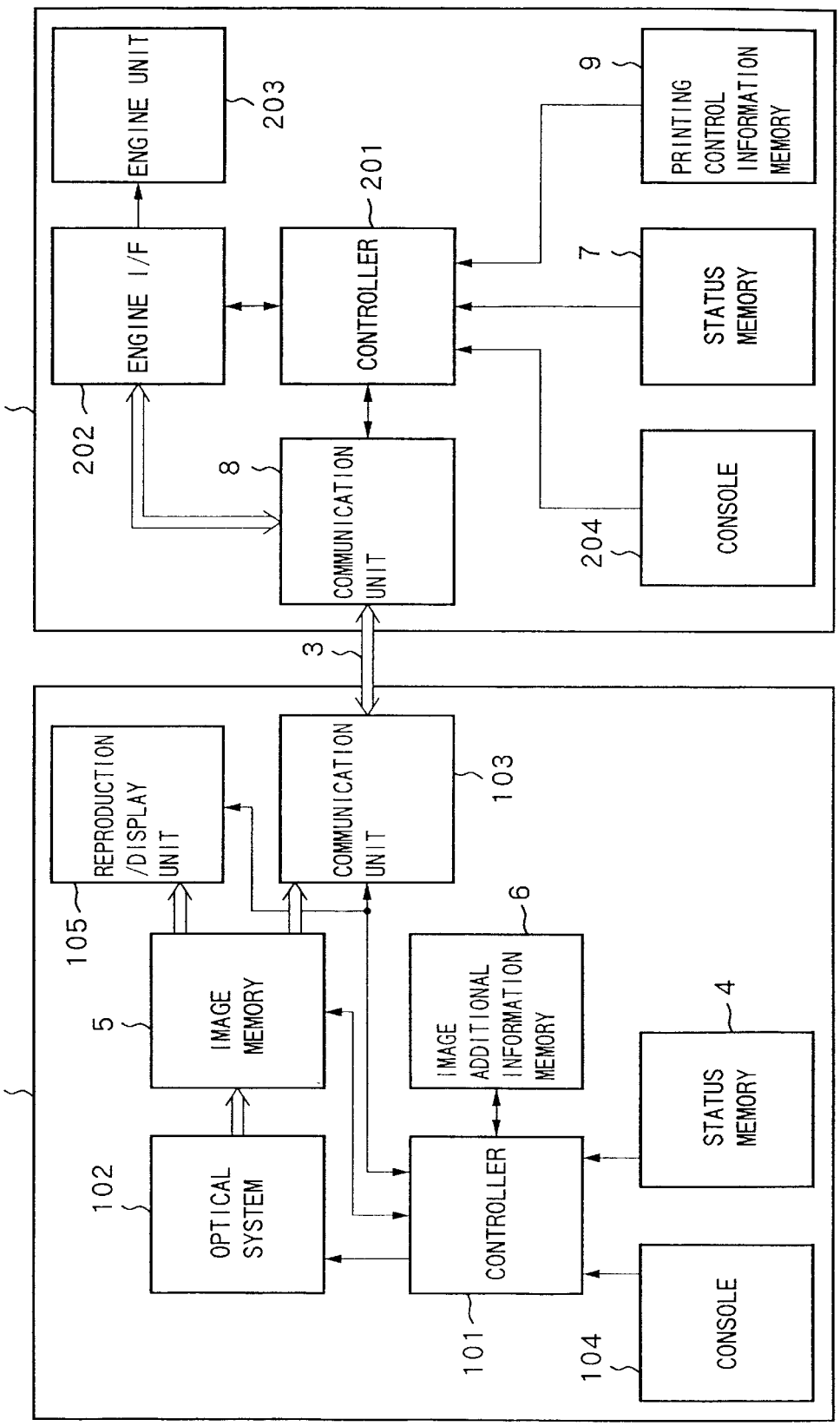
FIG. 13 is a block diagram showing an example of the arrangement of a digital image printing system according to an embodiment of the present invention.

FIG. 13 is a block diagram of the printing system shown in FIG. 1. In FIG. 13, the digital camera 1 is controlled by a controller 101. An image is sensed by an optical system 102, and is stored in the image memory 5. In this case, the controller 101 controls the optical system in accordance with the camera unique information 13-16 (FIG. 2) and the resolution information 13-1 to the stop information 13-5 set at a console 104, which are stored in the status memory 4. The zoom ratio, stop, and the like of the optical system 102 are controlled by the controller 101 to perform image processing for an image signal in accordance with setups. The setup data are stored in the image additional information memory 6. Furthermore, a reproduction/display unit 105 reproduces and displays the image information stored in the image memory 6 on the basis of the image additional information that records the image sensing conditions and the like of that image. The display screen of the reproduction/display unit 105 is normally an LCD with a small number of pixels in, e.g., a portable digital camera or the like, and an image is displayed in correspondence with such display conditions. Note that the optical system 102 focuses light reflected by an object via a lens, stop, and the like to form an image at a focal plane, and converts the focused light into an image signal using a photoelectric conversion means such as a CCD and the like.

The printer 2 is controlled by a controller 201, which reads out the image information, image additional information, and unique information via the communication unit 8 and a communication unit 103 of the camera. The readout image information is sent from an engine I/F 202 to an ink-jet engine unit 203, and is printed out from the engine unit 203. In this case, the engine I/F 202 and engine unit 203 are controlled in accordance with setups by the operator at a console 204, the printer unique information stored in the status memory 7, parameters stored in the printing control information memory 9, and the like. The method of selecting the control processing is as has already been described above.

IEEE1394 as an example of the interface between the digital image input device 1 and printer 2 will be explained below.

Outline of IEEE1394 Technology

With the advent of home digital VTRs and DVDs, real-time, large-volume data transfer of, e.g., video data, audio data, and the like need be supported. In order to transfer such video data and audio data in real time to a personal computer (PC) or to another digital device, an interface that has required transfer functions and can realize high-speed data transfer is required. The interface developed to this end is the IEEE1394-1995 (High Performance Serial Bus) (to be referred to as a 1394 serial bus hereinafter).

Figure 14:
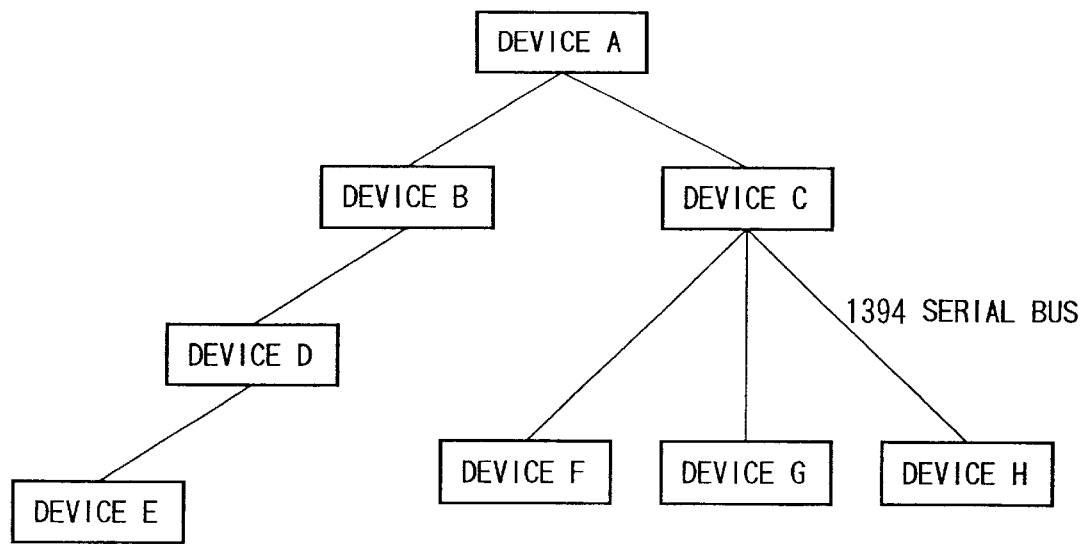
FIG. 14 is a diagram showing an example of a network system built using a 1394 serial bus.

FIG. 14 shows an example of a network system built using the 1394 serial bus. This system comprises devices A, B, C, D, E, F, G, and H, and devices A and B, A and C, B and D, D and E, C and F, C and G, and C and H are connected to each other via 1394 serial bus twisted pair cables. These devices A to H are, for example, a PC, digital VTR, DVD, digital camera, hard disk, monitor, and the like.

The connection methods between adjacent devices include both the daisy chain method and node branch method, and connections with a high degree of freedom can be realized.

The individual devices have their own unique IDs, and recognize each other to build a single network within the range connected via the 1394 serial bus. By sequentially connecting adjacent digital devices via a single 1394 serial bus cable, each device serves as a repeater, and constitutes a single network as a whole. Also, the 1394 serial bus has a plug-and-play function as its characteristic feature, and when a cable is connected to each device, the device itself and its connection state can be automatically recognized.

In the system shown in FIG. 14, when a certain device is removed from the network or a new device is added to the network, bus reset is automatically done to reset the network configuration used so far and to rebuild a new network. With this function, the network configuration can always be set and recognized.

The 1394 serial bus has a data transfer rate of 100/200/400 Mbps, and a device having a higher transfer rate supports the transfer rate of neighboring devices and attains compatibility.

Data transfer modes include an asynchronous transfer mode for transferring asynchronous data (to be referred to as Async data hereinafter) such as a control signal and the like, and an isochronous transfer mode for transferring isochronous data (to be referred to as Iso data hereinafter) such as real-time video data, audio data, and the like. Both the Async data and Iso data are transferred in each cycle (normally, 1 cycle=125 μs) following a cycle start packet (CSP) that indicates the start of a cycle, while giving priority to Iso data transfer.

Figure 15:
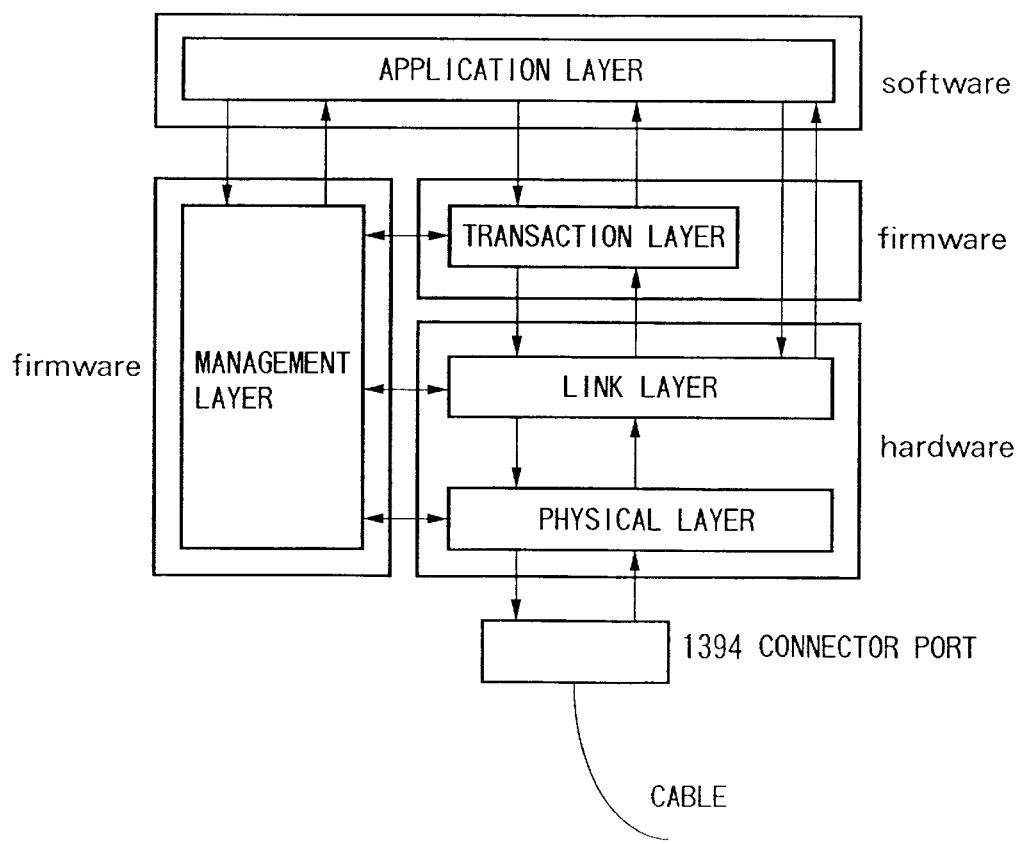
FIG. 15 shows the elements of the 1394 serial bus.

FIG. 15 shows the elements of the 1394 serial bus.

The 1394 serial bus has a layer (hierarchical) structure as a whole. As shown in FIG. 15, the cable of the 1394 serial bus is the lowest hardware layer, the connector of the cable is connected to a connector port, and hardware above the connector port includes the physical layer and link layer.

The hardware is an actual interface chip. Of the hardware, the physical layer performs coding and connector control and the like, and the link layer performs packet transfer and cycle time control and the like.

A transaction layer in firmware manages data to be transferred (transaction), and issues commands such as Read, Write, and the like. A management layer manages the connection states and IDs of the devices connected, i.e., manages the network configuration.

These hardware and firmware entities essentially make up the 1394 serial bus.

The application layer in software differs depending on the software used, and defines how to interface data. The application layer is defined by a protocol such as an AV protocol.

The architecture of the 1394 serial bus has been described.

Figure 16:
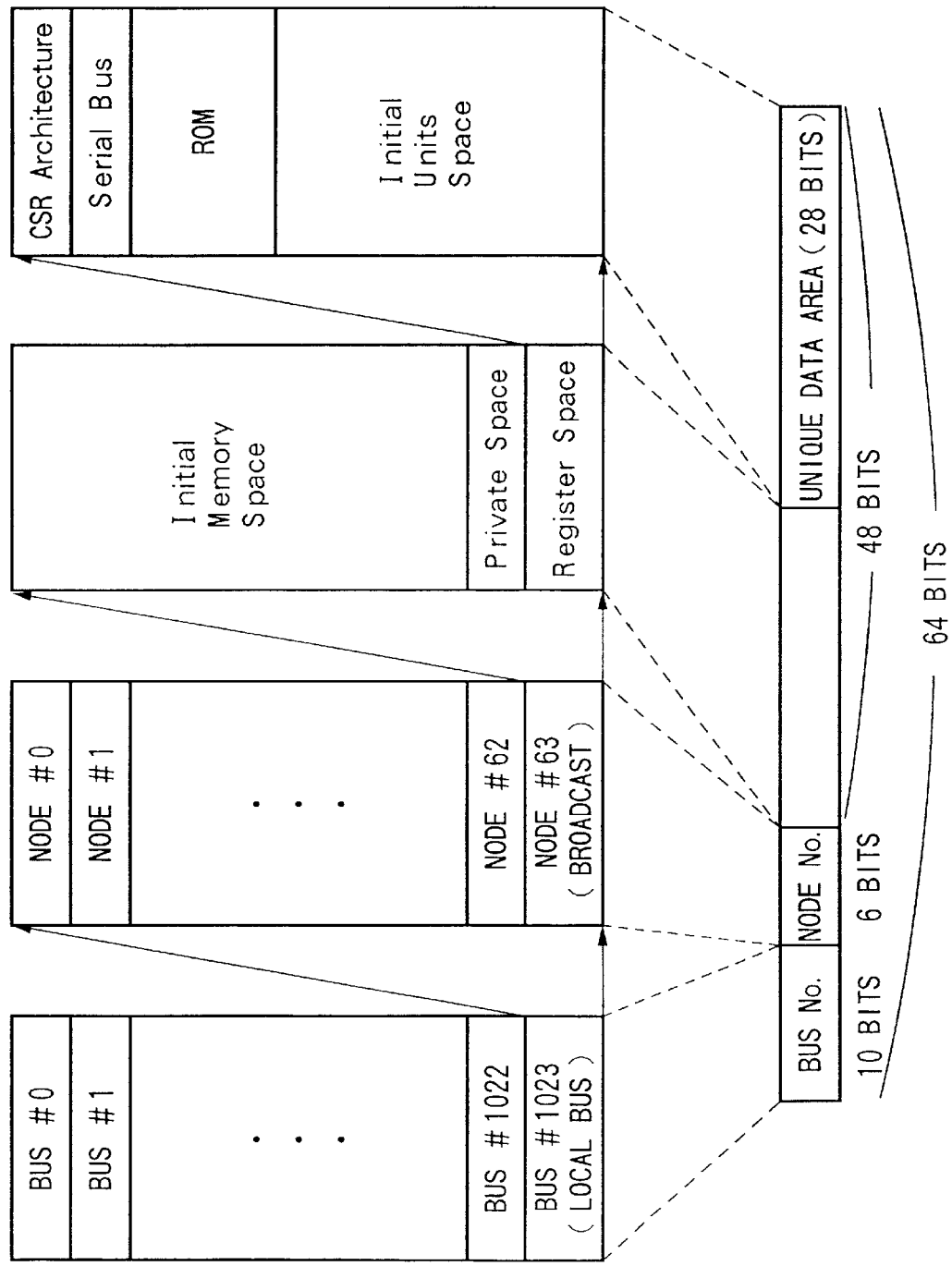
FIG. 16 shows the address space in the 1394 serial bus.

FIG. 16 shows the address space in the 1394 serial bus.

Each device (node) connected to the 1394 serial bus must have a unique 64-bit address. By storing this address in a ROM, the sender and receiver addresses in each communication can always be recognized, and a communication with the designated receiver can be made.

The 1394 address bus is addressed by a method complying with the IEEE1212 standards. Upon setting an address, first 10 bits are used to designate the bus number and the subsequent 6 bits are used to designate the node ID number. The remaining 48 bits are an address width given to each device, and can be used as a unique address space. The last 28 bits store information for identifying each device, designating use conditions, and so on as a unique data area.

The outline of the 1394 serial bus technology has been described.

The characteristic technique portion of the 1394 serial bus will be described in more detail below.

Electrical Specifications of 1394 Serial Bus

Figure 17:
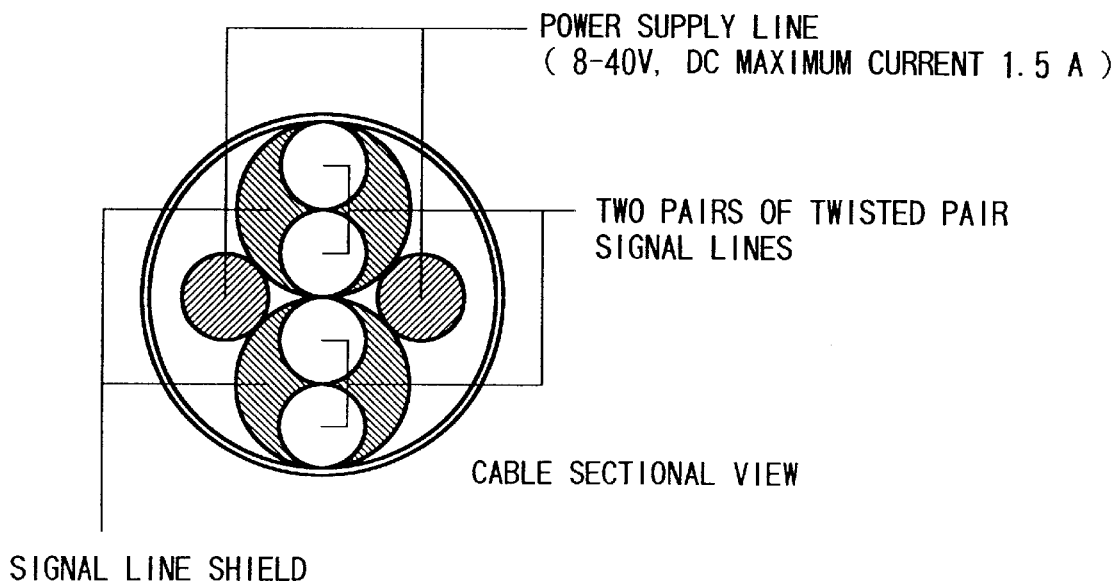
FIG. 17 is a sectional view of a 1394 serial bus cable.

FIG. 17 is a sectional view of the 1394 serial bus cable.

In the 1394 serial bus, the connection cable includes a power supply line in addition to two pairs of twisted pair signal lines. With this configuration, electric power can be supplied to a device without any power supply, a device that suffers voltage drop due to failure, and the like.

The prescribed power supply voltage in the power supply line ranges from 8 to 40 V, and the prescribed maximum current is DC 1.5 A.

DS-Link Coding

Figure 18:
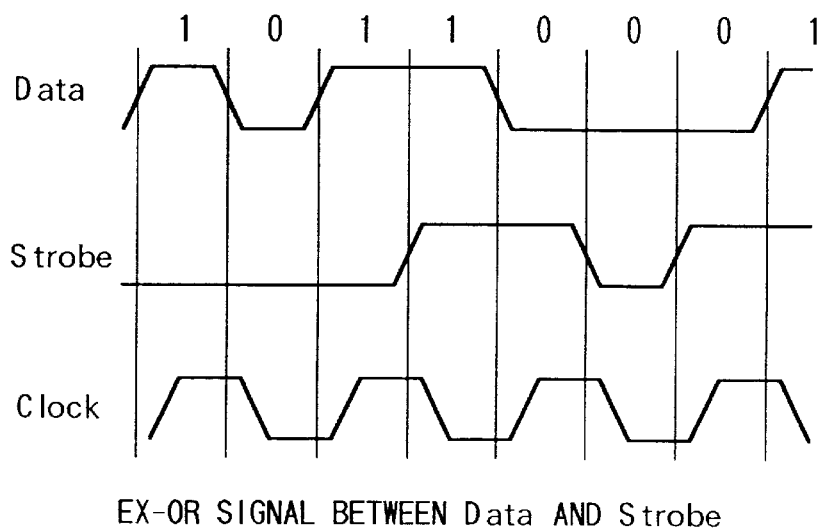
FIG. 18 is a chart for explaining DS-Link coding of the data transfer format adopted in the 1394 serial bus.

FIG. 18 is a chart for explaining DS-Link coding of the data transfer format adopted in the 1394 serial bus.

The 1394 serial bus adopts DS-Link (Data/Strobe Link) coding. The DS-Link coding is suitable for high-speed serial communications, and requires two signal lines. That is, one of a twisted pair line sends actual data, and the other sends a strobe signal.

The receiver side can reproduce clocks by exclusively ORing the received data and strobe signal.

As the merits of the DS-Link coding, higher transfer efficiency can be assured as compared to other serial data transfer methods, and the circuit scale of a controller LSI can be reduced since no PLL circuit is required. Also, since no information indicating an idle state need be sent if there is no data to be transferred, power savings can be attained by setting the transceiver circuits of the individual devices in a sleep state, and so on.

Bus Reset Sequence

In the 1394 serial bus, node IDs are assigned to the individual devices (nodes) connected to recognize them as the network configuration.

When the network configuration has changed, for example, when changes have taken place due to insertion/removal of a node or an increase/decrease in the number of nodes due to ON/OFF of their power switches, and a new network configuration need be recognized, each node that has detected the changes transmits a bus reset signal onto the bus to start a mode for recognizing the new network configuration. The change detection method at that time is attained by detecting changes in bias-voltage on the 1394 port board.

Upon receiving a bus reset signal transmitted from a certain node, the physical layer of each node informs the link layer of generation of bus reset simultaneously with the reception, and transmits a bus reset signal to another node. After all the nodes have detected the bus reset signal, the bus reset sequence is started.

The bus reset sequence is started by hardware detection of, e.g., insertion/disinsertion of cables, network abnormality, and the like, and is also started by a command directly issued to the physical layer by, e.g., host control from the protocol.

Once the bus reset sequence has been started, data transfer is temporarily interrupted until completion of the sequence, and upon completion of the sequence, the data transfer is restarted in the new network configuration.

The bus reset sequence has been described.

Node ID Determination Sequence

After the bus reset sequence, each node starts to assign an ID to the individual nodes so as to build a new network configuration. A general sequence from the bus reset until node ID determination will be explained below with reference to the flow charts in FIGS. 26, 27, and 28.

Figure 26:
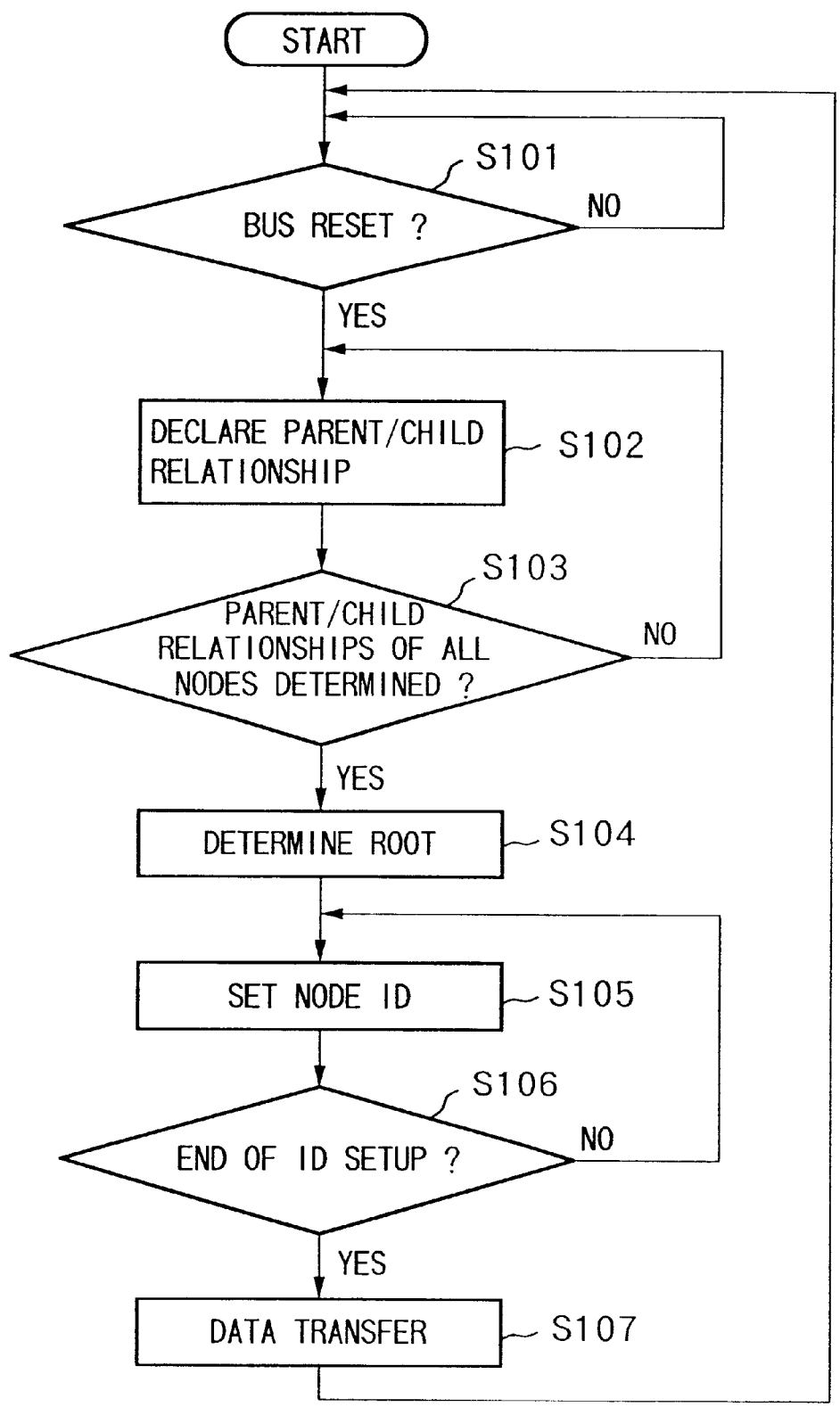
FIG. 26 is a flow chart showing the sequence from bus reset until data transfer is ready to start.

The flow chart in FIG. 26 shows a series of bus operations from generation of bus reset until data transfer is ready to restart after determination of the node IDs.

In step S101, the bus reset signal generated in the network is always monitored, and if it is determined in step S101 that the bus reset signal is generated due to, e.g., ON/OFF of the node power switch, the flow advances to step S102.

In step S102, directly connected nodes declare the parent/child relationship so as to recognize the new network connections from the reset state of the network. If it is determined in step S103 that the parent/child relationships are determined among all the nodes, a single root is determined in step S104. Before the parent/child relationships are determined among all the node, the parent/child relationship is repetitively declared in step S102, and no root is determined.

After the root is determined in step S104, node IDs are assigned to the individual nodes. The node IDs are set in a predetermined node order, and setting is repeated until IDs are assigned to all the nodes. If it is finally determined in step S106 that IDs are set for all the nodes, since a new network configuration has been recognized by all the nodes, data transfer between nodes is ready to restart in step S107, thus restarting data transfer.

In step S107, the control enters the mode for monitoring generation of the bus reset signal again, and upon detecting the bus reset signal, the control repeats the setting operations in steps S101 to S106.

Figure 27:
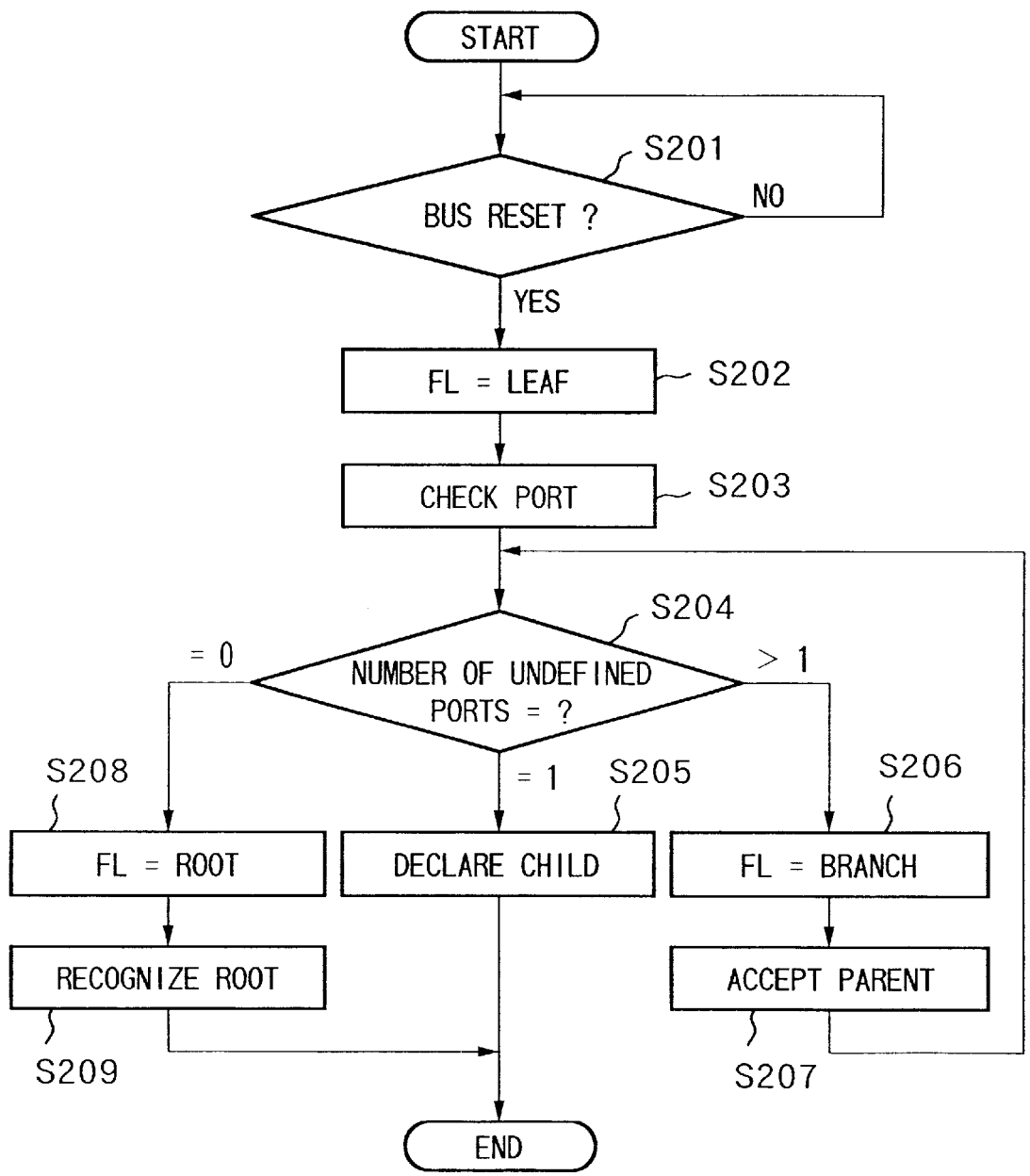
FIG. 27 is a detailed flow chart showing the sequence from bus reset until root determination.
Figure 28:
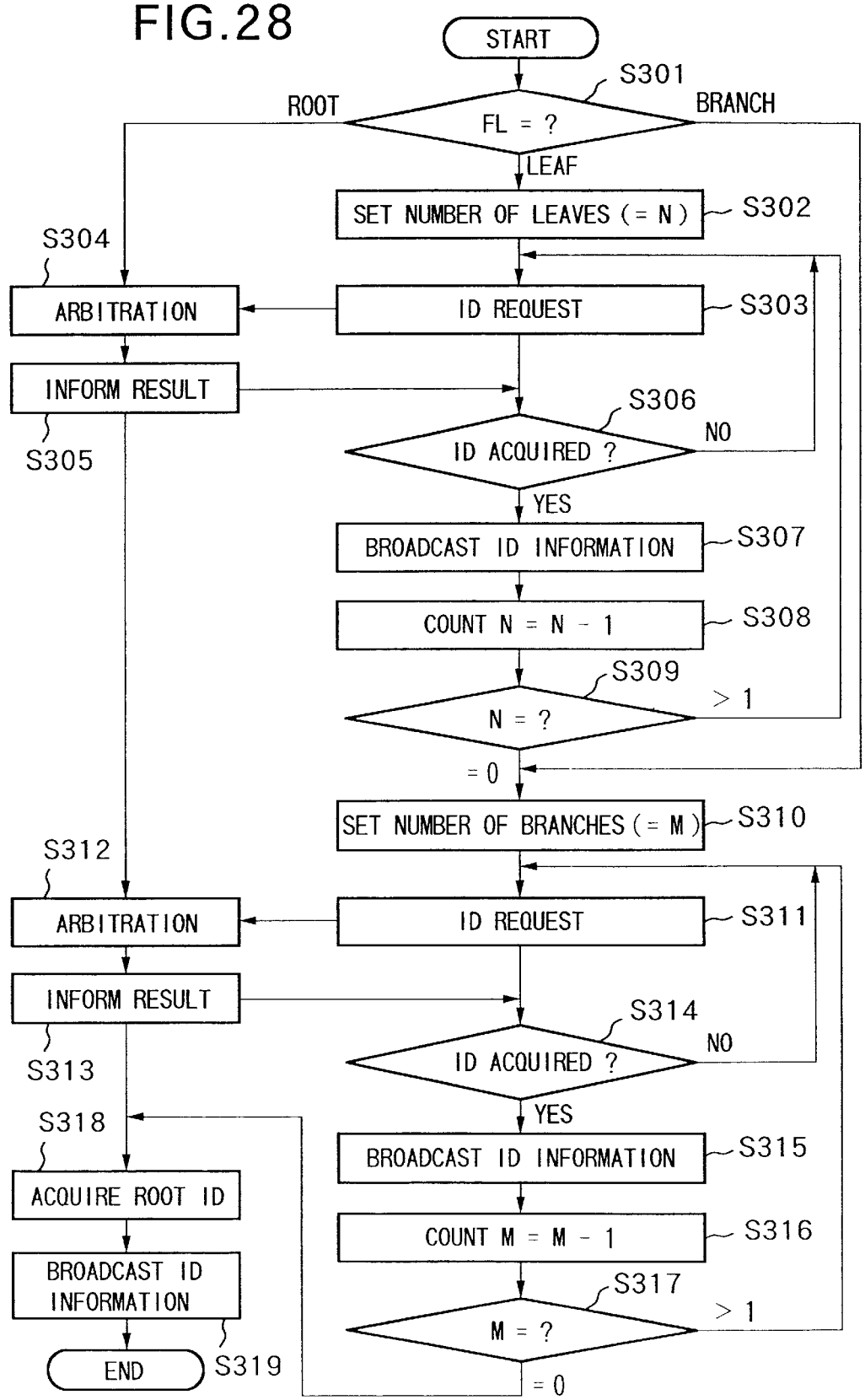
FIG. 28 is a flow chart showing the sequence from root determination until the end of ID setup.

The flow chart in FIG. 26 has been described. FIGS. 27 and 28 are flow charts respectively showing the sequence from bus reset until root determination, and the sequence after root determination until IDs are set in more detail, in the flow chart in FIG. 26.

The flow chart in FIG. 27 will be explained first.

If it is determined in step S201 that the bus reset signal is generated, the network configuration is temporarily reset. Note that generation of the bus reset signal is always monitored in step S201.

In step S202, as the first step of the operation for re-recognizing the connections of the reset network, a flag indicating a leaf (node) is set in each device. Furthermore, each device checks the number of nodes connected to its own port in step S203.

In accordance with the number of ports detected in step S204, the number of undefined ports (for which no parent/child relationship is determined yet) is checked. Immediately after bus reset, the number of ports=the number of undefined ports, but as the parent/child relationship is determined, the number of undefined ports detected in step S204 changes.

Immediately after bus reset, only a leaf can declare the parent/child relationship. Whether or not the own node is a leaf can be recognized based on the number of ports detected in step S203. The leaf declares that "the own node is a child, and the node connected is a parent" in step S205, thus ending the operation.

If the node recognizes that it has a plurality of ports and is a branch, since the number of undefined ports >1 is determined in step S204 immediately after bus reset, the flow advances to step S206 to set a flag indicating a branch, and that node waits until it accepts "parent" of the parent/child relationship declared by the leaf in step S207.

If the leaf has declared the parent/child relationship and the branch has accepted it in step S207, the branch checks the number of undefined ports in step S204, and if the number of undefined ports is 1, it declares that "the own node is a child" in step S205 with respect to the node connected to the remaining port. After the second checking loop and the subsequent loops, if the number of undefined ports confirmed in step S204 is still 2 or more, the branch waits until it accepts "parent" from the leaf or another branch in step S207.

Finally, if the number of undefined ports of one branch or, exceptionally, a leaf (if it does not operate quickly although it can declare "child") becomes zero as a result of detection in step S204, it is determined that the parent/child relationships of the entire network have been declared, and a flag indicating a root is set in one and only node, the number of undefined ports of which has become zero (i.e., it is determined as the parent port of all other nodes), in step S208. In step S209, that node is recognized as a root.

In this way, the sequence from bus reset until declaration of the parent/child relationships among all the nodes in the network shown in FIG. 27 is completed.

The flow chart in FIG. 28 will be explained below.

In the sequence until FIG. 27, since the individual nodes have already been set with information of flags indicating leaves, branches, and root, the flow branches in step S301 based on the set flag.

In the operation for assigning IDs to the nodes, ID assignment can be started from each leaf. IDs are set from smaller numbers (from the node number=0) in the order of leaf→branch→root.

In step S302, the number N of leaves (N is a natural number) in the network is set. In step S303, each leaf requests the root ID assignment. If there are more than one assignment requests, the root performs arbitration in step S304, and assigns an ID number to one winning node and informs the losing nodes of the failure result in step S305. In step S306, the leaf that has failed to acquire an ID issues an ID request again to repeat the above operations. The leaf that has acquired an ID broadcasts the acquired ID information to all other nodes in step S307. Upon completion of broadcasting of the ID information from one node, the number of remaining leaves is decremented by 1 in step S308. If it is determined in step S309 that the number of remaining leaves is larger than 1, the above-mentioned processing is repeated from the ID request in step S303. After all the leaves have broadcasted their ID information, N=0 is determined in step S309, and the control starts ID setups of branches.

The ID setups of branches are done in the same manner as in the leaves.

In step S310, the number M of branches in the network (M is a natural number) is set. After that, each branch requests ID assignment of the root in step S311. The root performs arbitration (for determining one branch) in step S312, and assigns the smallest unassigned ID number next to those assigned to the leaves to one winning branch in step S312. In step S313, the root informs the branches that issued the requests of ID information or the failure result. In step S314, each branch that has failed to acquire an ID issues an ID request again to repeat the above operations. The branch that has acquired an ID broadcasts the acquired ID information to all other nodes in step S315. Upon completion of broadcasting of the ID information from one node, the number of remaining branches is decremented by 1 in step S316. If it is determined in step S317 that the number of remaining branches is larger than 1, the above processing is repeated from the ID request in step S311 until all the branches finally broadcast their ID information. After all the branches have acquired node IDs, M=0 is determined in step S317 thus ending the branch ID acquisition mode.

After the above-mentioned sequence, since the node that has not acquired ID information yet is only the root, the root sets the smallest unassigned number as its own ID number in step S318, and broadcasts the ID information of the root in step S319.

In this fashion, the sequence after determination of the parent/child relationships until ID setups in all the nodes is completed, as shown in FIG. 28.

An example of operations in an actual network will be described below with reference to FIG. 19.

Figure 19:
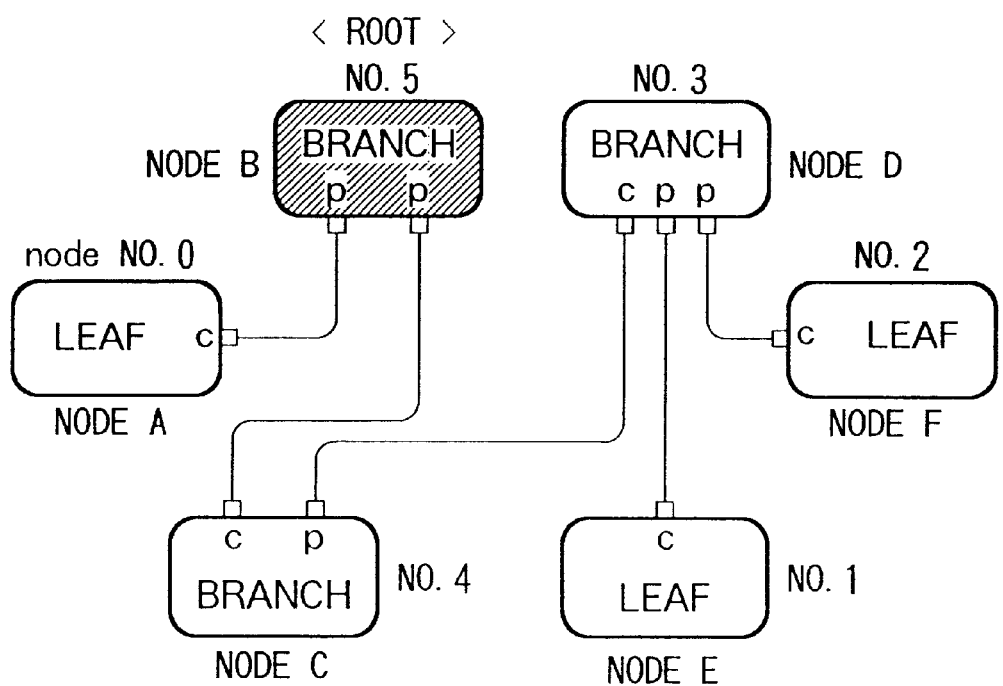
FIG. 19 is a diagram showing an example of the hierarchical structure of nodes.

Referring to FIG. 19, nodes A and C are directly connected to (root) node B as lower nodes, node D is directly connected to node C as a lower node, and nodes E and F are directly connected to node D as lower nodes, thus forming a layer structure. The layer structure and the sequence for determining the root node and node IDs will be explained below.

After the bus reset is done, the parent/child relationship is declared between the directly connected ports of the individual nodes. In the parent/child relationship, the parent is an upper node and the child is a lower node in the layer structure.

In FIG. 19, after the bus reset, node A declares the parent/child relationship initially. Basically, the parent/child relationship can be declared in the order from a node having a node connection at only one port (to be referred to as a leaf hereinafter). Since such node can detect first that it has only one port connection, the node recognizes that it is located at the end of the network, and the parent/child relationship is determined in the order from the node that has operated earliest. The port of the node which has declared the parent/child relationship (e.g., node A between nodes A and B) is set as a child, and the port of the node that has accepted the declaration (node B) is set as a parent. In this way, the child and parent are determined between nodes A and B, between nodes E and D, and between nodes F and D.

Ascending one layer, the nodes each having a plurality of connected ports (to be referred to as branches hereinafter) declare the parent/child relationships in turn from those that received the parent/child relationships declared by other nodes. In FIG. 19, after the parent/child relationships between nodes D and E and between nodes D and F are determined, node D declares the parent/child relationship with respect to node C, and as a result, the child and parent are determined between nodes D and C.

Node C that received the parent/child relationship declared by node D declares the parent/child relationship with respect to node B connected to the other node thereof. In this way, the child and parent are determined between nodes C and B.

As a result, the layer structure shown in FIG. 19 is formed, and node B which has become parent nodes at all the connected ports is finally determined to be a root node. One and only root node is present in one network configuration.

In FIG. 19, node B is determined to be a root node, but another node may be determined if node B that received the parent/child relationship declared by node A declares the parent/child relationship with respect to another node at earlier timing. More specifically, every node may become a root node depending on the transmission timings, and the root node is not always a specific node even in an identical network configuration.

After the root node is determined, the mode for determining node IDs is started. In this mode, all the nodes inform all other nodes of their own node IDs determined (broadcast function).

The own ID information includes the own node number, information of the connected position, the number of ports, the number of connected ports, the parent/child relationships of the individual ports, and the like.

The node ID number can be assigned from the nodes (leaves) each having only one connected port, and node numbers=0, 1, 2, . . . are assigned to these nodes in turn.

The node that has acquired an node ID broadcasts information including the node number to other nodes. With this broadcast, it is recognized that the ID number is "already assigned".

After all the leaves have acquired their own node IDs, node ID numbers following those of the leaves are assigned to branches. In the same manner as in the leaves, the branches that have been assigned node ID numbers broadcast their node ID information in turn in the assignment order, and finally, the root node broadcasts its own ID information. More specifically, the root always have a maximum node ID number.

In this way, node ID assignment for the entire layer structure ends, and the network architecture is reconfigured, thus completing initialization of the bus.

Arbitration

In the 1394 serial bus, the right of accessing the bus is arbitrated prior to data transfer. Since the 1394 serial bus is a logical bus type network in which the connected devices individually relay the transferred signal to send an identical signal to all the devices in the network, arbitration is required to prevent packet collision. With this arbitration, only one node can transfer a signal at a certain timing.

As the views for explaining arbitration, FIG. 20A shows bus access requests, and FIG. 20B shows a bus access grant. Arbitration will be explained below with reference to FIGS. 20A and 20B.

When arbitration is started, one or a plurality of nodes issue bus access requests to their parent node. In FIG. 20A, nodes C and F issue bus access requests. Upon receiving these requests, the parent node (node A in FIG. 20A) passes (relays) the bus access request to its parent node. This request is finally delivered to the root that performs arbitration.

Upon receiving the bus access request, the root node determines the node that is permitted to access the bus. This arbitration can be done by only the root node. The winning node in arbitration is granted bus access. In FIG. 20B, node C is granted bus access, and access by node F is denied. A DP (data prefix) packet is sent to the losing node in arbitration to inform it of denial. The bus access request of the denied node is queued until the next arbitration.

In this way, the node that wins the bus access grant in arbitration can subsequently start data transfer.

A series of operations in arbitration will be described below with reference to the flow chart in FIG. 29.

Each node can start data transfer only when the bus is idle. In order to recognize that the previous data transfer has ended and the bus is currently idle, each node determines that it can start data transfer if it detects an elapse of a predetermined idle time gap length (e.g., a subaction gap) set in each transfer mode.

In step S401, it is checked if a predetermined gap length according to the data to be transferred such as Async data, Iso data, and the like is obtained. Since the node cannot issue a bus access request required for starting transfer unless the predetermined gap length is obtained, it waits until the predetermined gap length is obtained.

If it is determined in step S401 that the predetermined gap length is obtained, it is checked in step S402 if the data to be transferred is present. If such data is present, the node issues a bus access request to the root to assure the bus so as to transfer the data. The bus access request signal is delivered finally to the root while being relayed by the devices in the network, as shown in FIG. 20A. If it is determined in step S402 that the data to be transferred is absent, the control waits for such data.

If in step S404 the root receives at least one bus access request issued in step S403, it checks the number of nodes that issued access requests in step S405. If the value selected in step S405 is the number of nodes=1 (i.e., only one node issued an access request), that node is granted bus access next. If the value selected in step S405 is the number of nodes >1 (a plurality of nodes issued access requests), the root performs arbitration for determining one node which is granted access in step S406. This arbitration is fair one; the right of access is evenly assigned to the nodes that requested bus access without a specific node always gaining bus access in every arbitration.

In step S407, the flow branches depending on one node that is granted access as a result of arbitration of the root from a plurality of nodes that issued access requests, and losing nodes. In step S408, the root sends a grant signal to one node, which has gained access as a result of arbitration, or a node, which has gained access without arbitration since it is determined based on the value selected in step S405 that the number of nodes that issued access requests=1. Upon receiving the grant signal, the node starts transfer of the data (packet) to be transferred immediately after reception. On the other hand, in step S409 the root sends a DP (data prefix) packet indicating an arbitration failure to the nodes that have lost in the arbitration in step S406 and are denied bus access. Upon receiving such packet, the flow returns to step S401, and the node waits until the predetermined gap length is obtained, so as to issue a bus access request for transferring data again.

Figure 29:
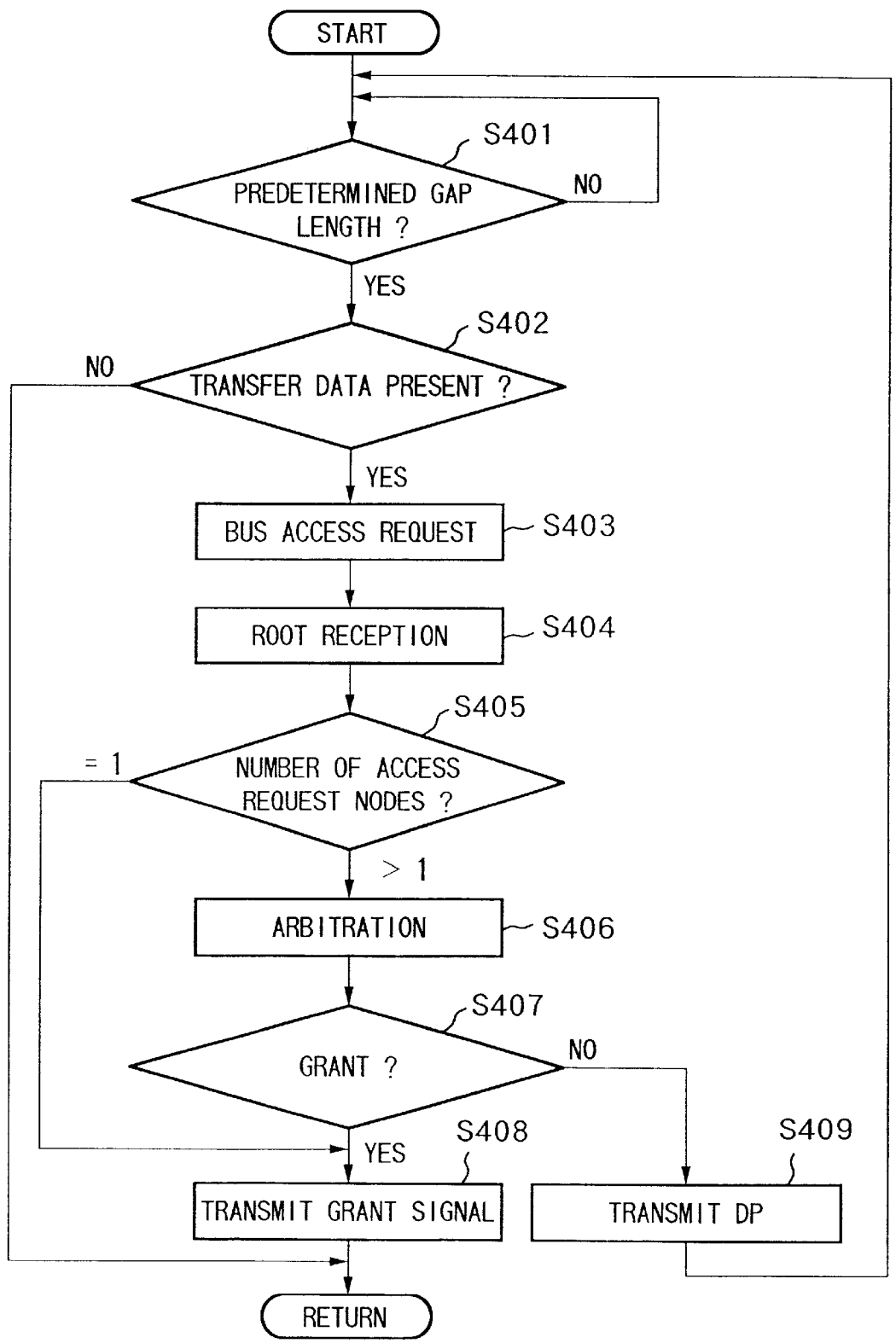
FIG. 29 is a flow chart showing the arbitration sequence.

The flow chart in FIG. 29 that explains the flow of arbitration has been described.

Asynchronous Transfer

Figure 21:
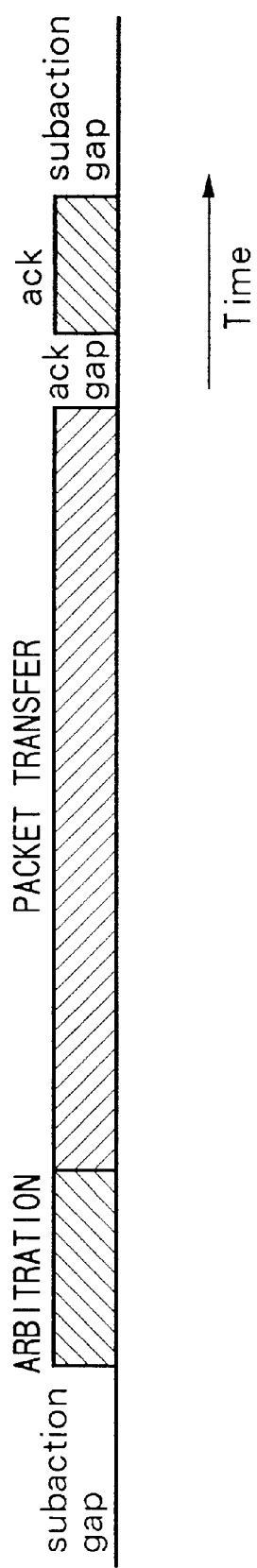
FIG. 21 is a chart showing progress of asynchronous transfer along with passage of time.

In asynchronous transfer, data are asynchronously transferred. FIG. 21 shows progress of asynchronous transfer along with passage of time. The first subaction gap in FIG. 21 indicates the idle state of the bus, and when this idle time reaches a predetermined value, the node that wants to transfer data determines that the bus can be used, and executes arbitration for gaining bus control.

When the node is permitted to access the bus as a result of arbitration, data transfer is done in the packet format. After the data transfer, the node that received the packet responds by sending back a reception result ack (reception acknowledgement send-back code) for the transferred data after a short gap called an ack gap or sends a response packet to complete transfer. The code ack consists of 4-bit information and 4-bit check sum and includes information indicating that data transfer is successful, busy, or pending. The code ack is immediately sent back to the source node.

Figure 22:
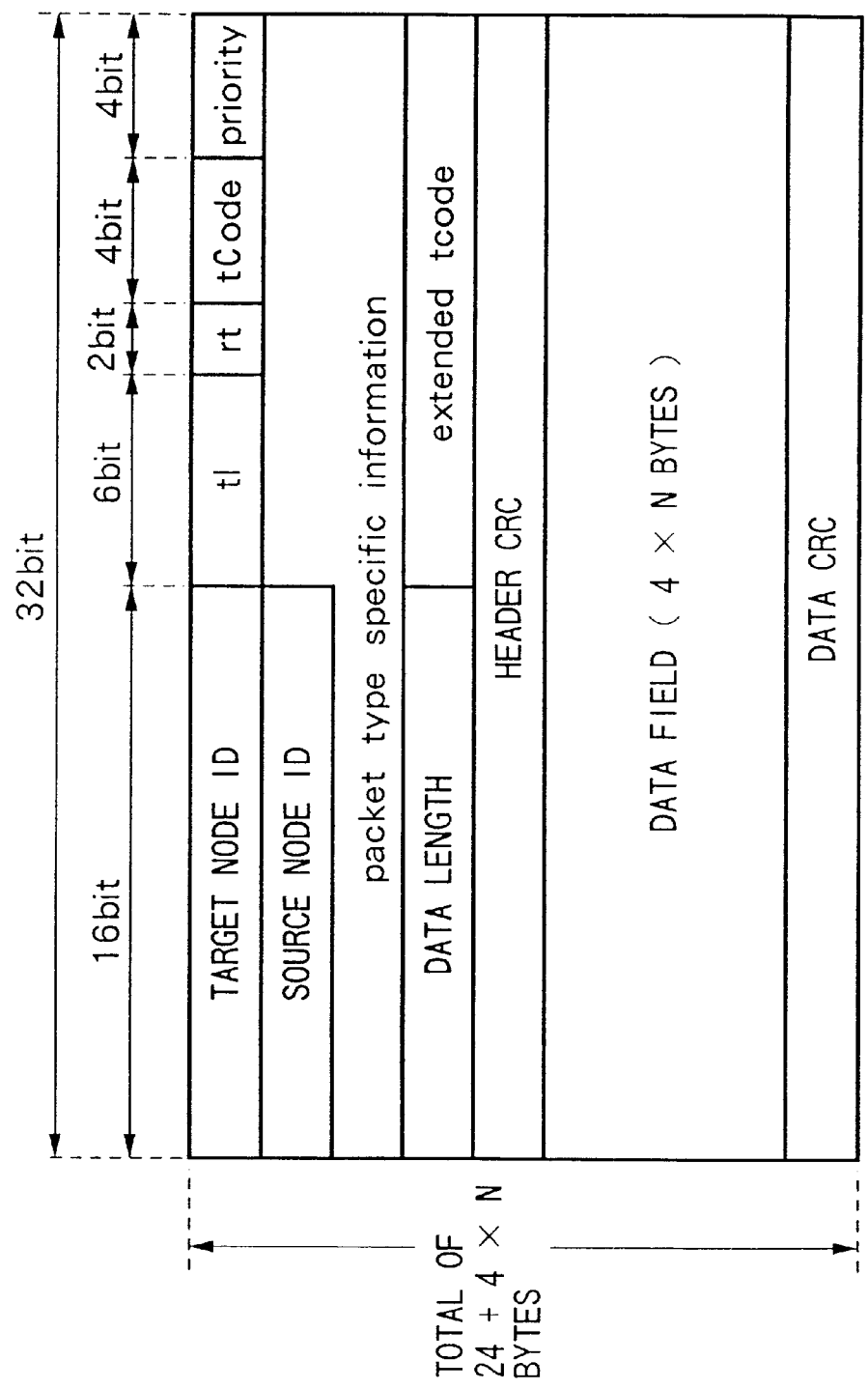
FIG. 22 shows an example of the packet format in asynchronous transfer.

FIG. 22 shows an example of the packet format in asynchronous transfer.

A packet has a header field in addition to a data field and error correction data CRC, and the header field is written with a destination node ID, source node ID, transfer data length, various codes, and the like to transfer the packet.

Asynchronous transfer is a one-to-one communication from the own node to the destination node. The packet transferred from the source node is transferred to all the nodes in the network, but each node ignores a packet with an address other than its own address, and only one destination node can read the packet.

Asynchronous transfer has been described.

Isochronous Transfer

In isochronous transfer, data are transferred isochronously. Isochronous transfer as the best feature of the 1394 serial bus is a transfer mode especially suitable for transferring data such as multimedia data (e.g., video data, audio data, and the like) that requires real-time transfer.

In contrast to asynchronous transfer as one-to-one transfer, isochronous transfer evenly transfers data from one node to all other nodes by the broadcast function (one-to-many).

Figure 23:
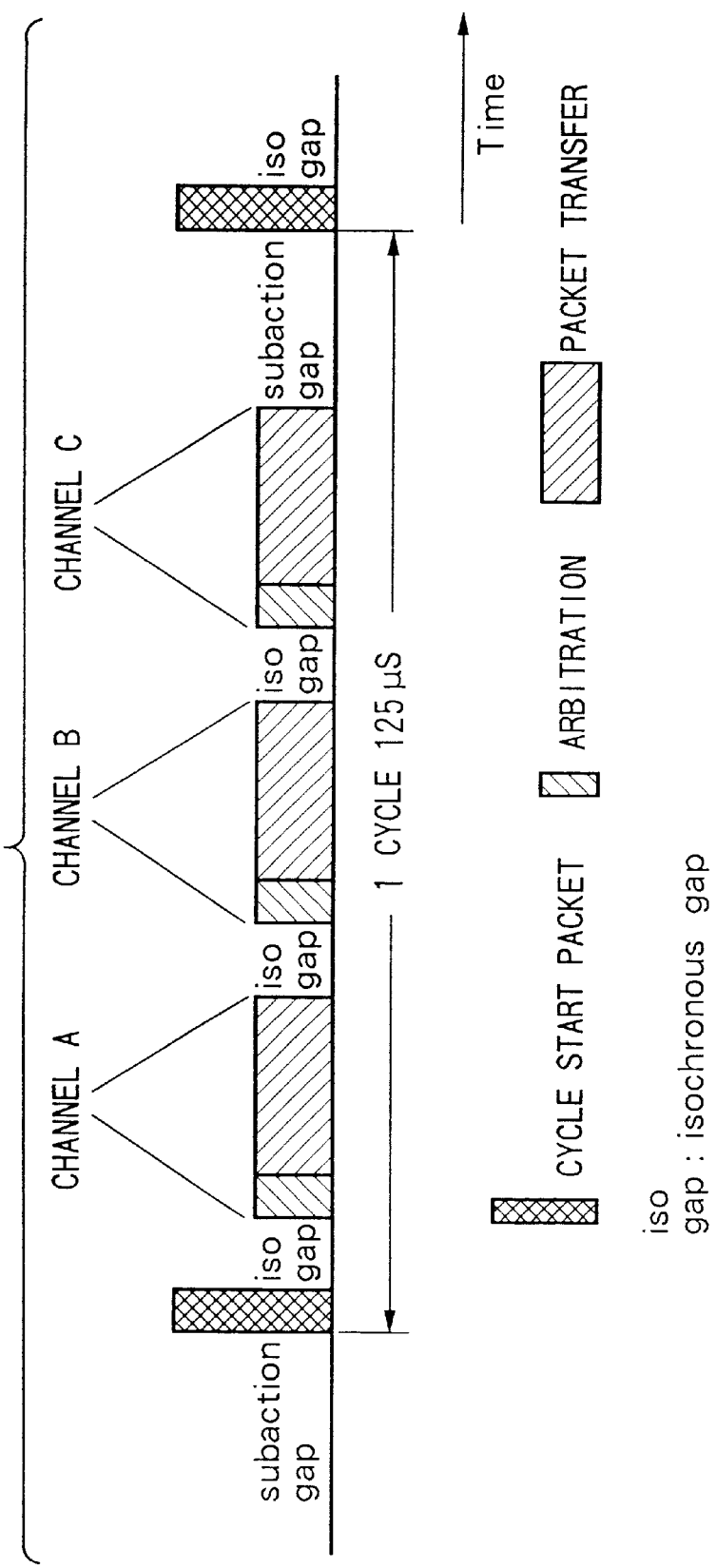
FIG. 23 is a chart showing progress of isochronous transfer along with passage of time.

FIG. 23 shows progress of isochronous transfer along with passage of time.

The isochronous transfer is executed at predetermined time intervals on the bus. This time interval is called an isochronous cycle. The isochronous cycle time is 125 µs. A cycle start packet indicates the start time of each cycle, and has a role of performing time adjustment of the individual nodes. A node called a cycle master transmits the cycle start packet. The cycle master transmits the cycle start packet indicating the start of the current cycle a predetermined idle period (subaction gap) after the completion of transfer in the previous cycle. The transmission time interval of adjacent cycle start packets is 125 µs.

As indicates by channels A, B, and C in FIG. 23, a plurality of different packets with different channel IDs can be separately transferred within one cycle. With this transfer, a plurality of nodes can attain real-time transfer at the same time, and the receiving node fetches only data with a desired channel ID. The channel ID does not represent any destination address but merely assigns a logical number to data. Hence, a certain packet is broadcasted from one source node to all other nodes.

Prior to packet transfer in the isochronous transfer mode, arbitration is made as in the asynchronous transfer mode. However, since the isochronous transfer mode is not a one-to-one communication mode unlike in the asynchronous transfer mode, no ack (reception acknowledgement sendback code) is present in the isochronous transfer mode.

An iso gap (isochronous gap) shown in FIG. 23 represents an idle period required for recognizing the idle state of the bus before the isochronous transfer. After an elapse of the predetermined idle period, the node which wants to start isochronous transfer determines that the bus is idle, and can perform arbitration before transfer.

Figure 24:
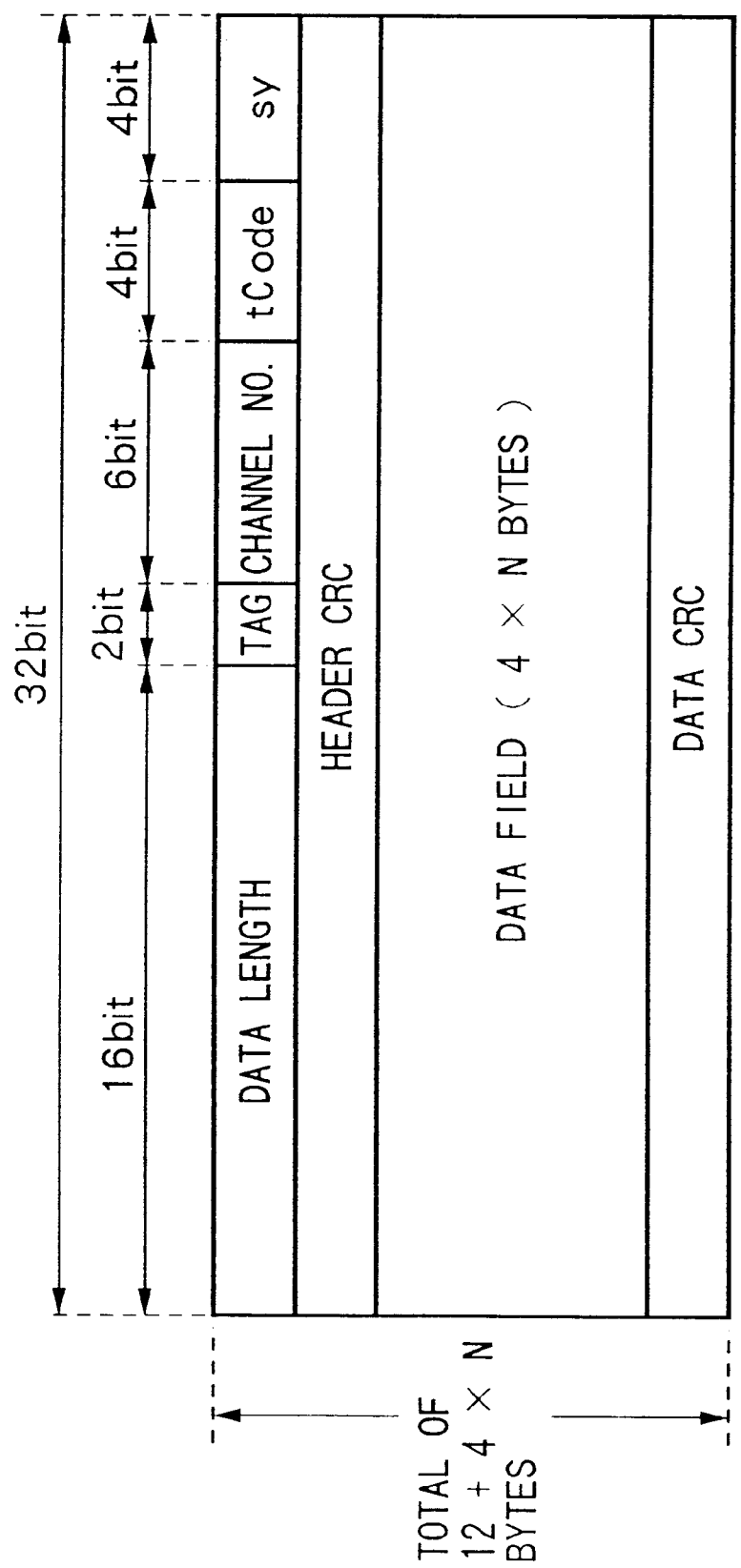
FIG. 24 shows an example of the packet format in isochronous transfer.

FIG. 24 shows an example of the packet format of isochronous transfer, and the format will be explained below.

Each of various types of packets assigned to the individual channels has a header field in addition to a data field and error correction data CRC. The header field is written with the transfer data length, channel No., various codes, error correction header CRC, and the like, so as to transfer the packet.

The isochronous transfer has been described.

Bus Cycle

Figure 25:
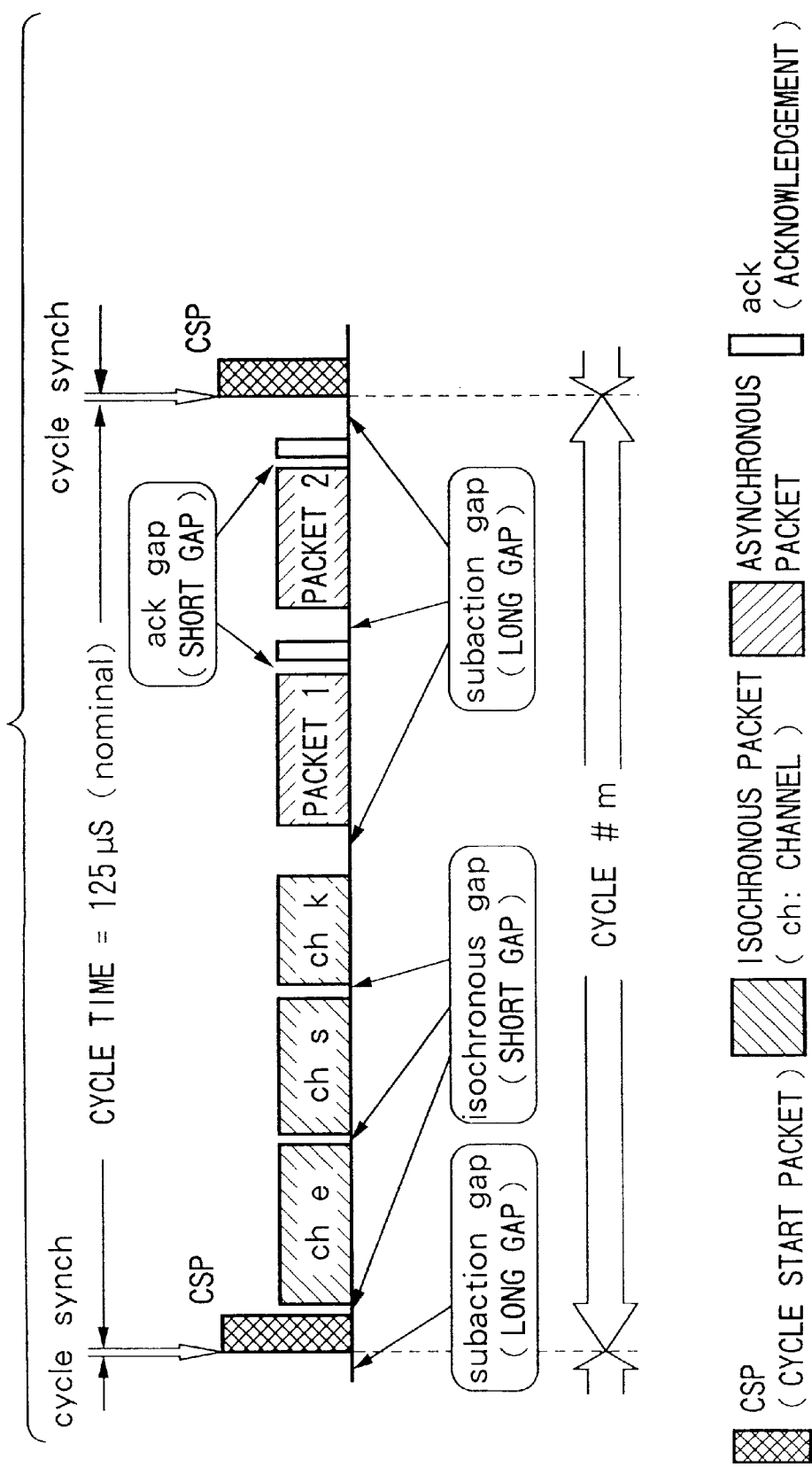
FIG. 25 is a chart showing progress of both isochronous transfer and asynchronous transfer on a bus along with passage of time.

In practical transfer on the 1304 serial bus, both the isochronous and asynchronous transfer modes can be simultaneously included in a single cycle. FIG. 25 shows progress of both isochronous transfer and asynchronous transfer on the bus along with passage of time.

The isochronous transfer mode is executed prior to the asynchronous transfer mode. This is because the isochronous transfer mode can be started by confirming a gap length (iso gap) shorter than the gap length (subaction gap) required for starting the asynchronous transfer mode. Hence, the isochronous transfer mode is executed prior to the asynchronous transfer mode.

In general bus cycles shown in FIG. 25, the cycle start packet is transferred from the cycle master to each individual node at the start timing of cycle #m. With this packet, the individual nodes perform time adjustment, and the node which is to perform isochronous transfer arbitrates after an elapse of a predetermined idle period (iso gap) so as to start packet transfer. In FIG. 25, channels e, s, and k are isochronously transferred in turn.

Upon completion of all the isochronous transfer channels in cycle #m after the operation from the arbitration to packet transfer is repeated in correspondence with the number of assigned channels, isochronous transfer is ready to start.

When the idle time has reached the subaction gap that allows the asynchronous transfer, the node which is to perform asynchronous transfer determines that it can execute arbitration.

Note that the asynchronous transfer can be performed during only a period wherein the subaction gap for starting asynchronous transfer can be assured from the end of the isochronous transfer until the time (cycle synch) at which the next cycle packet is to be transferred.

In cycle #m in FIG. 25, isochronous transfer for three channels and asynchronous transfer for two packets (packets 1 and 2; including ack) are done. After asynchronous packet 2, since the time (cycle synch) for starting cycle m+1 has been reached, transfer in cycle #m ends.

If the time (cycle synch) at which the next cycle start packet is to be transmitted has been reached during asynchronous or isochronous transfer, that transfer is not forcibly interrupted, and the next cycle start packet is transmitted an idle period after the end of that transfer. More specifically, when one cycle continues over 125 µs, the next cycle is shortened than the reference cycle time of 125 µs. In this manner, the isochronous cycle can be extended or shortened with reference to 125 µs.

However, the isochronous transfer is executed to maintain real-time transfer every cycle if necessary, and asynchronous transfer may be postponed to the next or subsequent cycle due to the shortened cycle time.

Second Embodiment

The printing control information memory 9 stored in the printer 2 shown in FIG. 1 may be arranged in the digital image input device 1 (digital camera in this embodiment) in place of the printer. For example, the digital camera 1 may often be connected to a printer suitable for printing recorded image data, i.e., a printer that can directly print out the recorded image data. Alternatively, the digital image input device may perform special image processing, and may cause a specific printer to forcibly perform printing control processing suitable for the image processing executed in the digital camera. In such case, it is effective to make the digital camera 1 have the printing control information memory 9 in step 18-5 for determining printing control processing in FIG. 7. It is confirmed if the printing control processing technique (to be referred to as recommended printing control processing hereinafter) designated by the digital image input device 1 is present. If such processing is present, the processing may be requested and forcibly used. The recommended printing control processing technique is stored as a camera recommended printing parameter 13-17 in FIG. 2.

Figure 12:
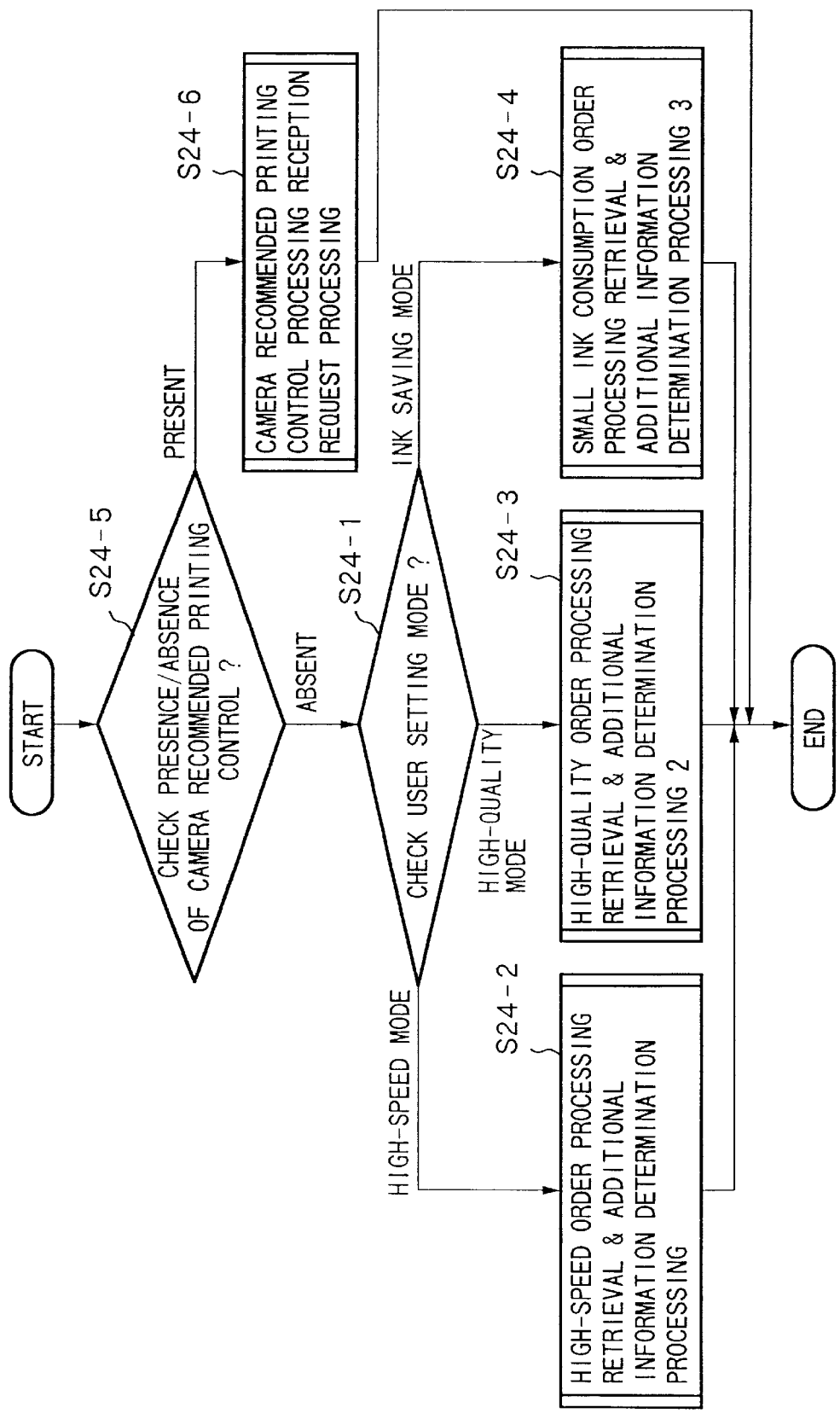
FIG. 12 is a flow chart showing an example of the processing for determining printing control processing in the second embodiment.

FIG. 12 is a flow chart of the processing in step 18-5 in such case.

In step 24-5, it is checked if the data format that stores the information of the digital image input device shown in FIG. 2 includes recommended printing control processing. If recommended printing control processing is present, the digital camera 1 is requested to acquire recommended printing control processing in step 24-6 independently of the user's designation, and the acquired processing is selected as the printing processing.

If the recommended printing control processing is not present, the flow advances to step 24-1 to check the mode set by the user. Depending on the checking result in step 24-1, high-speed order processing retrieval processing & additional information determination processing (step 24-2), high-quality order processing retrieval processing & additional information determination processing 2 (step 24-3), or small ink consumption order processing retrieval processing & additional information determination processing 3 (step 24-4) is done.

In this manner, if the camera stores the printing control technique suitable for the digital camera that sensed an image, the image can be printed out by the printing processing technique suitable for it.

Third Embodiment

Figure 10:
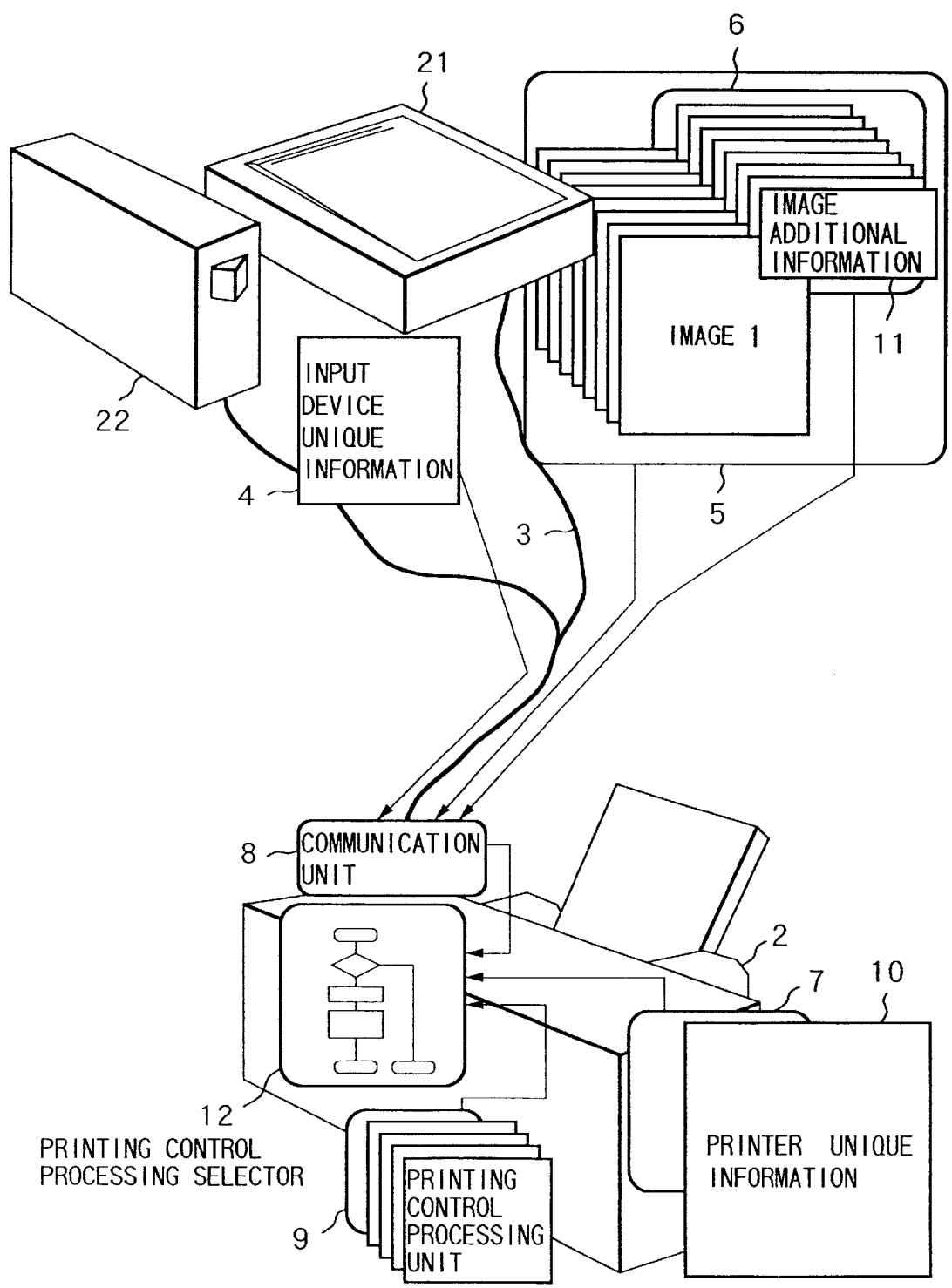
FIG. 10 is a schematic view showing the arrangement of another embodiment.

An image reader such as a flatbed scanner may be used as the digital image input device 1 shown in FIG. 1. In this case, for example, the use conditions of an electronic flash, stop, object distance, and the like are not required in the data format shown in FIG. 2. FIG. 10 shows the arrangement of the printing system in this case. A flatbed scanner 21 or optical film scanner 22 is used as the digital image input device in the system in place of the digital camera as the digital image input device shown in FIG. 1.

Fourth Embodiment

Figure 11:
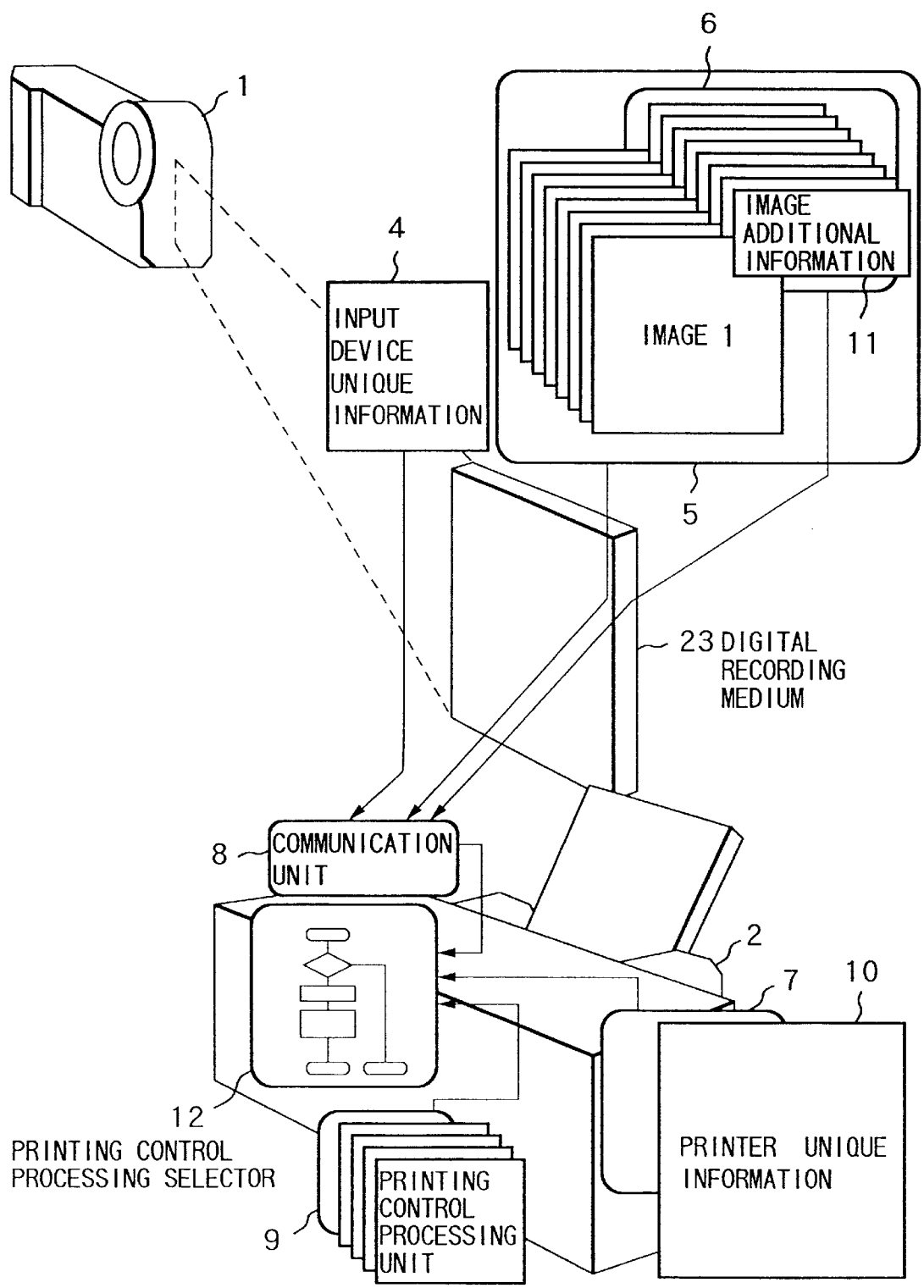
FIG. 11 is a schematic view showing the arrangement of a printing system according to the second embodiment of the present invention.

The digital camera 1 shown in FIG. 1 may be replaced by an electronic storage media connection device such as a PCMCIA card reader, compact flash card reader, or the like. FIG. 11 shows the arrangement of the printing system in this case. In this case, in place of the communication medium 3 shown in FIG. 1, an electronic storage medium 23 such as a PCMCIA card, CF card, IC card, hard disk, FD, MD, CD, DVD, or the like records image information and its additional information, and digital image input device unique information. In this case, the printer comprises a reader/writer of the same medium as that of the digital image input device. When the medium is loaded into the device and its contents are read, information transmission is done. In such case, unique data of the digital image input device shown in FIG. 2 are recorded in correspondence with individual image data. That is, a single recording medium may store image data from a plurality of types of digital image input devices, and a single digital image input device is not always assigned to a particular digital recording medium.

Fifth Embodiment

The communication medium 3 shown in FIG. 1 may use infrared ray communications in place of an electric connection cable. When infrared ray communications are used, no connection of the cables are required, and remote control can be done. In this case, since reliable connections cannot always be guaranteed, communication processing may be controlled to acquire image information in advance in the determination processing associated with other information in FIG. 9, and to execute all the subsequent processing operations by the printer alone.

Sixth Embodiment

In FIG. 1, the image memory 5 and the image additional information memory 6 may be replaced by a single memory. In this case, the image input state for each stored image may be stored in the memory to have a one-to-one correspondence therebetween, or may be stored inside image information as its header.

Seventh Embodiment

In the determination processing associated with other information in FIG. 9, when a plurality of transmission media such as a cable and infrared ray communication means, a cable and recording media, and the like are present between the printer and digital image input device, the print speed may be increased or the resolution of the image to be printed may be selected depending on the state of the currently available transmission medium, so as to select and print an image with an information volume corresponding to the speed designated by the user.

Other Embodiments

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

According to the present invention, since the image forming conditions set upon forming image data by, e.g., image sensing in the digital image input device, and the printing conditions at the printer for printing the image data are mediated, an image can be printed out with highest quality and highest speed under the set conditions.

As many apparently widely different embodiments of the present invention can be made without departing from the spirit and scope thereof, it is to be understood that the invention is not limited to the specific embodiments thereof except as defined in the appended claims.

What is claimed is:

1. An image forming system comprising:
    a digital camera having:
        recording means for recording image recording parameters of a target image when the target image is captured, together with the target image, wherein the image recording parameters include a plurality of variables which depend on each image sensing operation and a camera unique printing parameter which does not depend on each image sensing operation and is unique for the camera, and
        reproduction means for reproducing the target image and the image recording parameters recorded by said recording means; and an image forming apparatus having:
  setting means for setting an image forming mode that affects printing speed in accordance with the camera unique printing parameter included in the image recording parameters reproduced by said reproduction means; and
  image forming means for forming the image according to the image forming mode set by said setting means.

2. The system according to claim 1, wherein said image forming means comprises means for forming an image by ink-jet recording.

3. The system according to claim 1, wherein the image forming mode condition is restricted by an ink-jet recording method.

4. The system according to claim 3, wherein the image forming mode includes a first ink consumption mode having a predetermined ink consumption amount, and a second ink consumption mode having an ink consumption amount larger than the first ink consumption mode.

5. The system according to claim 3, wherein the image forming mode includes the quality of the image to be formed.

6. The system according to claim 3, wherein the image forming mode includes an ON/OFF state of reciprocal printing.

7. The system according to claim 1, wherein the camera unique printing parameter included in the image recording parameters is a camera recommended printing parameter.

8. An image forming system according to claim 1, wherein said setting means sets a high-speed printing mode as the image forming mode independently of the mode set by a user.

9. An image forming system comprising:
  a digital camera having:
    recording means for recording image recording parameters of a target image when the target image is captured, together with the target image, wherein the image recording parameters include a plurality of variables which depend on each image sensing operation and a camera unique printing parameter which does not depend on each image sensing operation and is unique for the camera, and
    reproduction means for reproducing the target image and the image recording parameters recorded by said recording means; and
  an image forming apparatus having:
    setting means for setting an image forming mode that affects printing speed in accordance with the camera unique printing parameter included in the image recording parameters reproduced by said reproduction means,
    image forming means for forming an image according to the image forming mode, and
    determination means for determining a printing process for printing the target image in accordance with the image sensing operation and the image forming mode set by said setting means.

10. The system according to claim 9, wherein said digital camera and said image forming apparatus are connected via a serial bus.

11. The system according to claim 10, wherein said serial bus complies with USB standards.

12. The system according to claim 10, wherein said serial bus complies with IEEE 1394 standards.

13. The system according to claim 9, wherein said determination means is included in said digital camera.

14. The system according to claim 9, wherein said determination means is included in said image forming apparatus.

15. The system according to claim 9, wherein said determination means determines the image forming mode while assigning priority to quality of the image to be formed.

16. An image forming apparatus used together with an electronic device having reproduction means for reproducing a target image and image recording parameters recorded by recording means for recording the image recording parameters of the target image when the target image is sensed, together with the image, wherein the image recording parameters include a plurality of variables which depend on each image sensing operation and a camera unique printing parameter which does not depend on each image sensing operation and is unique for the camera, said image forming apparatus comprising:
  setting means for setting an image forming mode that affects printing speed in accordance with the camera unique printing parameter included in the image recording parameters reproduced by said reproduction means; and
  image forming means for forming an image according to the image forming mode set by said setting means.

17. The apparatus according to claim 16, wherein said image forming means comprises means for forming an ink-jet recording image.

18. The apparatus according to claim 16, wherein the image forming mode is restricted by an ink-jet recording method.

19. The apparatus according to claim 18, wherein the image forming mode includes a first ink consumption mode having a predetermined ink consumption amount, and a second ink consumption mode having an ink consumption amount larger than the first ink consumption mode.

20. The apparatus according to claim 18, wherein the image forming mode includes the quality of the image to be formed.

21. The apparatus according to claim 18, wherein the image forming mode includes an ON/OFF state of reciprocal printing.

22. The apparatus according to claim 16, wherein the camera unique printing parameter included in the image recording parameters is a camera recommended printing parameter.

23. An image forming apparatus used together with a digital camera having reproduction means for reproducing a target image and image recording parameters recorded by recording means for recording the image recording parameters of the target image when the target image is captured, together with the image, wherein the image recording parameters include a plurality of variables which depend on each image sensing operation and a camera unique printing parameter which does not depend on each image sensing operation and is unique for the camera, said image forming apparatus comprising:
  setting means for setting an image forming mode that affects printing speed in accordance with the camera unique printing parameter included in the image recording parameters reproduced by said reproduction means;
  image forming means for forming an image according to the image forming mode; and
  determination means for determining a printing process for printing the target image in accordance with the image recording parameters and the image forming mode set by said setting means.

24. The apparatus according to claim 23, wherein said digital camera and said image forming apparatus are connected via a serial bus.

25. The apparatus according to claim 24, wherein said serial bus complies with USB standards.

26. The apparatus according to claim 24, wherein said serial bus complies with IEEE 1394 standards.

27. The apparatus according to claim 23, wherein said determination means is included in the digital camera.

28. The apparatus according to claim 23, wherein said determination means is included in said image forming apparatus.

29. The apparatus according to claim 23, wherein said determination means determines the image forming mode while assigning priority to the quality of the image to be formed.

30. An image forming method for forming an image in accordance with an image signal from a digital camera having reproduction means for reproducing a target image and image recording parameters recorded by recording means for recording an image sensing condition of the target image when the target image is captured, together with the image, wherein the image recording parameters include a plurality of variables which depend on each image sensing operation and a camera unique printing parameter which does not depend on each image sensing operation and is unique for the camera, said method comprising the steps of:

setting an image forming mode that affects printing speed in accordance with the camera unique printing parameter included in the image recording parameters reproduced by said reproduction means; and forming the target image.

31. A storage medium for storing a computer program for forming an image in accordance with an image signal from a digital camera having reproduction means for reproducing a target image and image recording parameters recorded by recording means for recording the image recording parameters of the target image together with the image, wherein the image recording parameters include a plurality of variables which depend on each image sensing operation and a camera unique printing parameter which does not depend on each image sensing operation and is unique for the camera, said program stored on said storage medium including the processing steps of:

setting an image forming mode that affects printing speed, in accordance with the camera unique printing parameter included in the image recording parameters reproduced by said reproduction means; and forming the target image.

* * * * *

UNITED STATES PATENT AND TRADEMARK OFFICE
CERTIFICATE OF CORRECTION

PATENT NO. : 6,736,476 B2
DATED : May 18, 2004
INVENTOR(S) : Hirowo Inoue et al.

It is certified that error appears in the above-identified patent and that said Letters Patent is hereby corrected as shown below:

Title page,
Item [57], ABSTRACT,
Line 2, "as" should read -- such as --.

Column 7,
Line 46, "Param-" should read -- param- --.

Column 14,
Line 52, "an" should read -- a--.
Line 63, "have" should read -- has --.

Column 21,
Line 12, "condition" should be deleted.

Signed and Sealed this

Twenty-fourth Day of August, 2004

JON W. DUDAS
*Director of the United States Patent and Trademark Office*